US009467209B2

(12) United States Patent
Wang et al.

(10) Patent No.: US 9,467,209 B2
(45) Date of Patent: Oct. 11, 2016

(54) METHOD, APPARATUS, AND TERMINAL DEVICE FOR NEAR FIELD COMMUNICATION RADIO FREQUENCY COMMUNICATION

(71) Applicant: Huawei Device Co., Ltd., Shenzhen (CN)

(72) Inventors: Miao Wang, Beijing (CN); Zhihao Jin, Beijing (CN); Xinmiao Chang, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/573,629

(22) Filed: Dec. 17, 2014

(65) Prior Publication Data

US 2015/0105015 A1    Apr. 16, 2015

Related U.S. Application Data

(63) Continuation of application No. PCT/CN2013/072192, filed on Mar. 5, 2013.

(51) Int. Cl.
*H04B 5/02* (2006.01)
*H04W 76/02* (2009.01)

(52) U.S. Cl.
CPC ............... *H04B 5/02* (2013.01); *H04W 76/02* (2013.01)

(58) Field of Classification Search
CPC .......... G06K 7/0008; G06K 7/10237; H04M 2250/04; H04W 74/004; H04W 8/005; H04W 4/008; H04W 76/045; G06Q 20/357; G06Q 20/3278; G06Q 20/3226; H04B 5/0031
See application file for complete search history.

(56) References Cited

U.S. PATENT DOCUMENTS

2010/0197224 A1    8/2010    Lahdenniemi et al.
2011/0130095 A1    6/2011    Naniyat et al.
(Continued)

FOREIGN PATENT DOCUMENTS

CN    101241541 A    8/2008
CN    101536008 A    9/2009
(Continued)

OTHER PUBLICATIONS

Chen et al, CN101241541, Google translated.*
(Continued)

*Primary Examiner* — Ping Hsieh
*Assistant Examiner* — James Yang
(74) *Attorney, Agent, or Firm* — Conley Rose, P.C.; Grant Rodolph

(57) ABSTRACT

A method for near field communication (NFC) radio frequency communication includes acquiring, second configuration information of established radio frequency communication, where the established radio frequency communication is radio frequency communication that a second NFC host performs with a remote NFC endpoint using a near field communication controller (NFCC); and if the second configuration information matches first configuration information of radio frequency communication to be initiated by the first NFC host, sending, to the NFCC, an activate request command used to activate a radio frequency interface corresponding to the first configuration information, so that the NFCC activates the radio frequency interface and the first NFC host performs the radio frequency communication with the remote NFC endpoint through the radio frequency interface. The embodiments of the present invention provide a radio frequency communication mechanism for an NFC device under a multi-host architecture.

18 Claims, 11 Drawing Sheets

(56) References Cited

U.S. PATENT DOCUMENTS

| | | | |
|---|---|---|---|
| 2011/0244797 | A1 | 10/2011 | Kulkarni et al. |
| 2012/0028579 | A1 | 2/2012 | Fine et al. |
| 2012/0182912 | A1 | 7/2012 | Watfa et al. |
| 2012/0309302 | A1 | 12/2012 | Buhot |
| 2012/0329393 | A1 | 12/2012 | Hillan et al. |
| 2014/0035727 | A1* | 2/2014 | Nguyen .................. 340/10.1 |

FOREIGN PATENT DOCUMENTS

| | | | |
|---|---|---|---|
| CN | 101729676 | A | 6/2010 |
| CN | 102047223 | A | 5/2011 |
| CN | 102184593 | A | 9/2011 |
| CN | 102194085 | A | 9/2011 |
| CN | 102318315 | A | 1/2012 |
| CN | 102388596 | A | 3/2012 |
| CN | 102710302 | A | 10/2012 |
| WO | 2009120481 | A2 | 10/2009 |

OTHER PUBLICATIONS

Wise, Mobile Networks and Apps, 2012 htttps://developer.amazon.com/public/community/post/TxZZNCHJFAFY3A/MobileNetworksandAppsontheKindleFireHD894GLTE.*
ISO, ISO_IEC14443-4, 2001.*
NFCF, NFCForum-TS-NCI-1.0, 2012.*
"Smart Cards; UICC—Contactless Front-end (CLF) Interface; Host Controller Interface (HCI) (Release 10)," ETSI TS 102 622, V10.2.0, Technical Specification, Mar. 2011, 56 pages.
NCI Forum, NFC Controller Interface (NCI) Specification, Technical Specification, Retrieved from the Internet: URL: http://www.cardsys.dk/download/NFC_Docs/NFC Controller Interface (NCI) Technical Specification.pdf [retrieved on Nov. 18, 2013], Nov. 6, 2012, 146 pages.
Foreign Communication From a Counterpart Application, European Application No. 13877157.1 Extended European Search Report dated Jun. 18, 2015, 7 pages.
Partial English Translation and Abstract of Chinese Patent Application No. CN101241541A, Jan. 26, 2015, 3 pages.
Foreign Communication From a Counterpart Application, PCT Application No. PCT/CN2013/072192, English Translation of International Search Report dated Dec. 12, 2013, 2 pages.
Foreign Communication From a Counterpart Application, PCT Application No. PCT/CN2013/072192, Written Opinion dated Dec. 12, 2013, 6 pages.
"Near Field Communication Interface and Protocol-2 (NFCIP-2)," ETSI TS 102 312, V1.1.1, Technical Specification, Feb. 2004, 9 pages.
Foreign Communication From a Counterpart Application, Chinese Application No. 201380000497.0, Chinese Search Report dated Jul. 28, 2014, 2 pages.
Foreign Communication From a Counterpart Application, Chinese Application No. 201380000497.0, Chinese Office Action dated Aug. 4, 2014, 9 pages.
Foreign Communication From a Counterpart Application, Chinese Application No. 201380000497.0, Chinese Office Action dated Dec. 29, 2014, 1 page.
Foreign Communication From a Counterpart Application, Chinese Application No. 201380000497.0, Chinese Search Report dated Dec. 12, 2014, 2 pages.

* cited by examiner

METHOD, APPARATUS, AND TERMINAL DEVICE FOR NEAR FIELD COMMUNICATION RADIO FREQUENCY COMMUNICATION

CROSS-REFERENCE TO RELATED APPLICATIONS

This application is a continuation of International Application PCT/CN2013/072192, filed on Mar. 5, 2013, which is hereby incorporated by reference in its entirety.

TECHNICAL FIELD

Embodiments of the present invention relate to the field of communications, and in particular, to a method, an apparatus, and a terminal device for near field communication radio frequency communication.

BACKGROUND

Near field communication (NFC) is a short-distance radio connection technology and a radio frequency identification (RFID) based technology, which implements short-distance communication between electronic devices using magnetic induction. With increasing popularity of the NFC technology, a lot of electronic products, such as printers, television (TV) sets, sound boxes, mobile phones, and cameras, have already integrated an NFC function.

An NFC device is mainly formed by the following three functional entities: a device host (DH), an NFC controller (NFCC), and a security element (SE). The DH is responsible for management of the NFCC, such as initialization, configuration, and power management; the NFCC is responsible for physical transmission of data through a radio frequency interface and an antenna; and the SE can provide a secure executing environment for an NFC application program. A logical interface is defined at an NFC control interface (NCI) for communication between the DH and the NFCC. Communication may be performed between the DH and the NFCC using an NCI protocol. In addition, communication may be performed between the NFCC and the SE using a communications protocol such as the Host Controller interface (HCI) protocol or Single Wire Protocol (SWP).

An NFC device is generally in a single host architecture. In the single host architecture, an NFCC is connected to a DH only, but is not connected to an SE; the DH is connected to the SE; and a host of the NFCC is the DH and the NFCC is controlled only by the DH. With development of the NFC technology, a multi-host architecture is proposed at present. In the multi-host architecture, an NFCC is connected to a DH and one or more SEs separately; and the NFCC is a shared resource, both the DH and the SE that are connected to the NFCC are hosts of the NFCC, and both the DH and the SE can control the NFCC to perform NFC radio frequency communication. The prior art, however, does not provide a mechanism for the NFCC to be controlled by multiple hosts to perform radio frequency communication under the multi-host architecture.

SUMMARY

Embodiments of the present invention provide a method, an apparatus, and a terminal device for near field communication radio frequency communication, so as to provide a radio frequency communication mechanism under a multi-host architecture.

According to a first aspect, a method for NFC radio frequency communication is provided and includes acquiring, by a first NFC host, second configuration information of established radio frequency communication, where established radio frequency communication is radio frequency communication that a second NFC host performs with a remote NFC endpoint using a NFCC; and if the second configuration information matches first configuration information of radio frequency communication to be initiated by the first NFC host, sending, by the first NFC host, to the NFCC, an activate request command used to activate a radio frequency interface corresponding to the first configuration information, so that the NFCC activates the radio frequency interface and the first NFC host performs the radio frequency communication with the remote NFC endpoint through the radio frequency interface.

In a first possible implementation manner of the first aspect, the first configuration information at least includes a radio frequency protocol identifier and a radio frequency interface identifier; and the second configuration information at least includes a radio frequency protocol identifier; the radio frequency protocol identifier is used to identify a protocol used for radio frequency communication between the NFCC and the remote NFC endpoint; and the radio frequency interface identifier is used to identify the radio frequency interface corresponding to the first configuration information; and that the second configuration information matches first configuration information of radio frequency communication to be initiated by the first NFC host includes that the radio frequency protocol identifier in the second configuration information is the same as the radio frequency protocol identifier in the first configuration information.

With reference to the first aspect or the first possible implementation manner of the first aspect, in a second possible implementation manner, the acquiring, by a first NFC host, second configuration information of established radio frequency communication includes acquiring, by the first NFC host, state information used to indicate a state of the NFCC; if the state of the NFCC is an active state, sending, by the first NFC host, to the NFCC, a first get information request command used to acquire the second configuration information; and receiving, by the first NFC host, the second configuration information sent by the NFCC; or sending, by the first NFC host, to the NFCC, a second get information request command used to acquire state information and the second configuration information; and receiving, by the first NFC host, state information and the second configuration information that are sent by the NFCC in an active state, where the state information is used to indicate a state of the NFCC; or sending, by the first NFC host, to the NFCC, a third get information request command used to acquire the second configuration information; and receiving, by the first NFC host, the second configuration information sent by the NFCC in an active state.

According to a second aspect, a method for NFC radio frequency communication is provided and includes sending, by a first NFC host, to an NFCC, first configuration information of radio frequency communication to be initiated, so that the NFCC in an active state determines whether the first configuration information matches second configuration information, and after it is determined that the first configuration information matches the second configuration information, activates a radio frequency interface corresponding to the first configuration information, so that the first NFC host performs the radio frequency communication with a remote NFC endpoint through the radio frequency interface, where the second configuration information is configuration information of radio frequency communication that a second NFC host performs with the remote NFC endpoint using the NFCC.

In a first possible implementation manner of the second aspect, the sending, by a first NFC host, to an NFCC, first configuration information of radio frequency communication to be initiated includes sending, by the first NFC host, directly to the NFCC, the first configuration information of the radio frequency communication to be initiated; or acquiring, by the first NFC host, state information used to indicate a state of the NFCC; and if the state of the NFCC is a non-idle state, sending, by the first NFC host, to the NFCC, the first configuration information of the radio frequency communication to be initiated; where the first configuration information at least includes a radio frequency technology mode identifier used to identify a radio frequency technology and working mode adopted by the NFCC, a radio frequency protocol identifier used to identify a protocol used for radio frequency communication between the NFCC and the remote NFC endpoint, and a radio frequency interface identifier used to identify the radio frequency interface corresponding to the first configuration information.

According to a third aspect, a method for NFC radio frequency communication is provided and includes sending, by a NFCC in an active state, second configuration information of established radio frequency communication to a first NFC host, so that the first NFC host determines whether the second configuration information matches first configuration information of radio frequency communication to be initiated by the first NFC host, where the established radio frequency communication is radio frequency communication that a second NFC host performs with a remote NFC endpoint using the NFCC; receiving, by the NFCC, an activate request command that is sent by the first NFC host and used to activate a radio frequency interface corresponding to the first configuration information, where the activate request command is sent by the first NFC host after the first NFC host determines that the second configuration information matches the first configuration information; and activating, by the NFCC, the radio frequency interface according to the activate request command.

In a first possible implementation manner of the third aspect, the first configuration information at least includes a radio frequency protocol identifier and a radio frequency interface identifier; and the second configuration information at least includes a radio frequency protocol identifier; the radio frequency protocol identifier is used to identify a protocol used for radio frequency communication between the NFCC and the remote NFC endpoint; and the radio frequency interface identifier is used to identify the radio frequency interface corresponding to the first configuration information; and that the second configuration information matches the first configuration information includes that the radio frequency protocol identifier in the second configuration information is the same as the radio frequency protocol identifier in the first configuration information.

With reference to the third aspect or the first possible implementation manner of the third aspect, in a second possible implementation manner, before the sending, by a NFCC in an active state, second configuration information of established radio frequency communication to a first NFC host, the method further includes receiving, by the NFCC in an active state, a first get information request command that is sent by the first NFC host and used to acquire the second configuration information; or receiving, by the NFCC, a second get information request command that is sent by the first NFC host and used to acquire state information and the second configuration information, where the state information is used to indicate a state of the NFCC; or receiving, by the NFCC, a third get information request command that is sent by the first NFC host and used to acquire the second configuration information.

With reference to the third aspect or the first possible implementation manner of the third aspect or the second possible implementation manner of the third aspect, in a third possible implementation manner, after the activating, by the NFCC, the radio frequency interface according to the activate request command, the method further includes receiving, by the NFCC, a deactivate request command that is sent by the first NFC host or the second NFC host and used to deactivate the radio frequency interface; and if the NFCC further performs, under control of another NFC host, radio frequency communication with the remote NFC endpoint using a radio frequency protocol corresponding to the radio frequency interface, sending, by the NFCC, a deactivate response message that includes a cause identifier to the first NFC host or the second NFC host without ending the radio frequency communication with the remote NFC endpoint, where the cause identifier is used to indicate that the NFCC does not end the radio frequency communication with the remote NFC endpoint.

According to a fourth aspect, a method for NFC radio frequency communication is provided and includes receiving, by a NFCC, first configuration information of radio frequency communication to be initiated by a first NFC host, where the first configuration information is sent by the first NFC host; if the NFCC is in a non-idle state, determining, by the NFCC, whether second configuration information matches the first configuration information, where the second configuration information is configuration information of radio frequency communication that a second NFC host performs with a remote NFC endpoint using the NFCC; and if the second configuration information matches the first configuration information, activating, by the NFCC, a radio frequency interface corresponding to the first configuration information, so that the first NFC host performs the radio frequency communication with the remote NFC endpoint through the radio frequency interface.

In a first possible implementation manner of the fourth aspect, the first configuration information at least includes a radio frequency technology mode identifier used to identify a radio frequency technology and working mode adopted by the NFCC, a radio frequency protocol identifier used to identify a protocol used for radio frequency communication between the NFCC and the remote NFC endpoint, and a radio frequency interface identifier used to identify the radio frequency interface corresponding to the first configuration information; and that the second configuration information matches the first configuration information includes that the radio frequency protocol identifier in the second configuration information is the same as the radio frequency protocol identifier in the first configuration information; and the determining, by the NFCC, whether second configuration information matches the first configuration information includes determining, by the NFCC in a non-idle and non-active state, whether the radio frequency technology mode identifier in the second configuration information is the same as the radio frequency technology mode identifier in the first configuration information; and if the radio frequency technology mode identifier in the second configuration information is the same as the radio frequency technology mode identifier in the first configuration information, after a state of the NFCC becomes an active state, determining, by the NFCC, whether the radio frequency protocol identifier in the second configuration information is the same as the radio frequency protocol identifier in the first configuration information; or determining, by the NFCC in an active state, whether the radio frequency protocol identifier in the second configuration information is the same as the radio frequency protocol identifier in the first configuration information.

With reference to the fourth aspect or the first possible implementation manner of the fourth aspect, in a second possible implementation manner, after the activating, by the NFCC, a radio frequency interface corresponding to the first configuration information, the method further includes receiving, by the NFCC, a deactivate request command that is sent by the first NFC host or the second NFC host and used to deactivate the radio frequency interface; and if the NFCC further performs, under control of another NFC host, radio frequency communication with the remote NFC endpoint using a radio frequency protocol corresponding to the radio frequency interface, sending, by the NFCC, a deactivate response message that includes a cause identifier to the first NFC host or the second NFC host without ending the radio frequency communication with the remote NFC endpoint, where the cause identifier is used to indicate that the NFCC does not end the radio frequency communication with the remote NFC endpoint.

According to a fifth aspect, an NFC host is provided, where the NFC host is a first NFC host, and the NFC host includes a first acquiring module configured to acquire second configuration information of established radio frequency communication, where the established radio frequency communication is radio frequency communication that a second NFC host performs with a remote NFC endpoint using a NFCC; and a first sending module configured to, if the second configuration information acquired by the first acquiring module matches first configuration information of radio frequency communication to be initiated by the first NFC host, send, to the NFCC, an activate request command used to activate a radio frequency interface corresponding to the first configuration information, so that the NFCC activates the radio frequency interface and the first NFC host performs the radio frequency communication with the remote NFC endpoint through the radio frequency interface.

In a first possible implementation manner of the fifth aspect, the first configuration information at least includes a radio frequency protocol identifier and a radio frequency interface identifier; and the second configuration information at least includes a radio frequency protocol identifier; the radio frequency protocol identifier is used to identify a protocol used for radio frequency communication between the NFCC and the remote NFC endpoint; and the radio frequency interface identifier is used to identify the radio frequency interface corresponding to the first configuration information; and that the second configuration information matches first configuration information of radio frequency communication to be initiated by the first NFC host includes that the radio frequency protocol identifier in the second configuration information is the same as the radio frequency protocol identifier in the first configuration information.

With reference to the fifth aspect or the first possible implementation manner of the fifth aspect, in a second possible implementation manner, the first acquiring module is configured to acquire state information used to indicate a state of the NFCC, if the state of the NFCC is an active state, send, to the NFCC, a first get information request command used to acquire the second configuration information, and receive the second configuration information sent by the NFCC; or the first acquiring module is configured to send, to the NFCC, a second get information request command used to acquire state information and the second configuration information, and receive state information and the second configuration information that are sent by the NFCC in an active state, where the state information is used to indicate a state of the NFCC; or the first acquiring module is configured to send, to the NFCC, a third get information request command used to acquire the second configuration information; and receive the second configuration information sent by the NFCC in an active state.

According to a sixth aspect, an NFC host is provided, where the NFC host is a first NFC host, and the NFC host includes a second sending module configured to send, to an NFCC, first configuration information of radio frequency communication to be initiated, so that the NFCC in an active state determines whether the first configuration information matches second configuration information, and after it is determined that the first configuration information matches the second configuration information, activates a radio frequency interface corresponding to the first configuration information, so that the first NFC host performs the radio frequency communication with a remote NFC endpoint through the radio frequency interface, where the second configuration information is configuration information of radio frequency communication that a second NFC host performs with the remote NFC endpoint using the NFCC.

In a first possible implementation manner of the sixth aspect, the second sending module is configured to send, directly to the NFCC, the first configuration information of the radio frequency communication to be initiated; or the NFC host further includes a second acquiring module, where the second acquiring module is configured to acquire state information used to indicate a state of the NFCC; and the second sending module is configured to, if the state of the NFCC acquired by the second acquiring module is a non-idle state, send, to the NFCC, the first configuration information of the radio frequency communication to be initiated; where the first configuration information at least includes a radio frequency technology mode identifier used to identify a radio frequency technology and working mode adopted by the NFCC, a radio frequency protocol identifier used to identify a protocol used for radio frequency communication between the NFCC and the remote NFC endpoint, and a radio frequency interface identifier used to identify the radio frequency interface corresponding to the first configuration information.

According to a seventh aspect, an NFCC is provided and includes a third sending module configured to, when the NFCC is in an active state, send second configuration information of established radio frequency communication to a first NFC host, so that the first NFC host determines whether the second configuration information matches first configuration information of radio frequency communication to be initiated by the first NFC host, where the established radio frequency communication is radio frequency communication that a second NFC host performs with a remote NFC endpoint using the NFCC; a third receiving module configured to receive an activate request command that is sent by the first NFC host and used to activate a radio frequency interface corresponding to the first configuration information, where the activate request command is sent by the first NFC host after the first NFC host determines that the second configuration information matches the first configuration information; and a first activating module configured to activate the radio frequency interface according to the activate request command received by the third receiving module.

In a first possible implementation manner of the seventh aspect, the third receiving module is configured to before the third sending module sends the second configuration information of the established radio frequency communication to the first NFC host, when the NFCC is in an active state, receive a first get information request command that is sent by the first NFC host and used to acquire the second configuration information; or, the third receiving module is configured to before the third sending module sends the second configuration information of the established radio frequency communication to the first NFC host, receive a second get information request command that is sent by the first NFC host and used to acquire state information and the second configuration information, where the state information is used to indicate a state of the NFCC; or, the third receiving module is configured to before the third sending module sends the second configuration information of the established radio frequency communication to the first NFC host, receive a third get information request command that is sent by the first NFC host and used to acquire the second configuration information.

With reference to the seventh aspect or the first possible implementation manner of the seventh aspect, in a second possible implementation manner of the seventh aspect, the third receiving module is further configured to after the first activating module activates the radio frequency interface, receive a deactivate request command that is sent by the first NFC host or the second NFC host and used to deactivate the radio frequency interface; and the third sending module is further configured to, if the NFCC further performs, under control of another NFC host, radio frequency communication with the remote NFC endpoint using a radio frequency protocol corresponding to the radio frequency interface, send a deactivate response message that includes a cause identifier to the first NFC host or the second NFC host, where the cause identifier is used to indicate that the NFCC does not end the radio frequency communication with the remote NFC endpoint.

According to an eighth aspect, an NFCC is provided and includes a fourth sending module, a fourth receiving module, a determining module, and a second activating module; where the NFCC communicates with the outside using the fourth sending module and the fourth receiving module; the fourth receiving module is configured to receive first configuration information of radio frequency communication to be initiated by a first NFC host, where the first configuration information is sent by the first NFC host; the determining module is configured to, if the NFCC is in a non-idle state, determine whether second configuration information matches the first configuration information, where the second configuration information is configuration information of radio frequency communication that a second NFC host performs with a remote NFC endpoint using the NFCC; and the second activating module is configured to, if the determining module determines that the second configuration information matches the first configuration information, activate a radio frequency interface corresponding to the first configuration information, so that the first NFC host performs the radio frequency communication with the remote NFC endpoint through the radio frequency interface.

In a first possible implementation manner of the eighth aspect, the first configuration information at least includes a radio frequency technology mode identifier used to identify a radio frequency technology and working mode adopted by the NFCC, a radio frequency protocol identifier used to identify a protocol used for radio frequency communication between the NFCC and the remote NFC endpoint, and a radio frequency interface identifier used to identify the radio frequency interface corresponding to the first configuration information; and that the second configuration information matches the first configuration information includes that the radio frequency protocol identifier in the second configuration information is the same as the radio frequency protocol identifier in the first configuration information; and the determining module is configured to, if the NFCC is in a non-idle and non-active state, determine whether the radio frequency technology mode identifier in the second configuration information is the same as the radio frequency technology mode identifier in the first configuration information; and if the radio frequency technology mode identifier in the second configuration information is the same as the radio frequency technology mode identifier in the first configuration information, after a state of the NFCC becomes an active state, determine whether the radio frequency protocol identifier in the second configuration information is the same as the radio frequency protocol identifier in the first configuration information; or the determining module is configured to, if the NFCC is in an active state, determine whether the radio frequency protocol identifier in the second configuration information is the same as the radio frequency protocol identifier in the first configuration information.

With reference to the eighth aspect or the first possible implementation manner of the eighth aspect, in a second possible implementation manner, the fourth receiving module is further configured to, after the second activating module activates the radio frequency interface, receive a deactivate request command that is sent by the first NFC host or the second NFC host and used to deactivate the radio frequency interface; the fourth sending module is further configured to, if the NFCC further performs, under control of another NFC host, radio frequency communication with the remote NFC endpoint using a radio frequency protocol corresponding to the radio frequency interface, send a deactivate response message that includes a cause identifier to the first NFC host or the second NFC host, where the cause identifier is used to indicate that the NFCC does not end the radio frequency communication with the remote NFC endpoint.

According to a ninth aspect, a terminal device is provided and includes a first NFC host, a second NFC host, and an NFCC, where the first NFC host and the second NFC host are separately connected to the NFCC; the first NFC host is configured to acquire second configuration information of established radio frequency communication, where the established radio frequency communication is radio frequency communication that the second NFC host performs with a remote NFC endpoint using the NFCC; and if the second configuration information matches first configuration information of radio frequency communication to be initiated by the first NFC host, send, to the NFCC, an activate request command used to activate a radio frequency interface corresponding to the first configuration information; and the NFCC is configured to, when the NFCC is in an active state, send the second configuration information of the established radio frequency communication to the first NFC host; receive an activate request command that is sent by the first NFC host and used to activate the radio frequency interface corresponding to the first configuration information; and activate the radio frequency interface according to the activate request command.

In a first possible implementation manner of the ninth aspect, the first configuration information at least includes a radio frequency protocol identifier and a radio frequency interface identifier; the second configuration information at least includes a radio frequency protocol identifier; the radio frequency protocol identifier is used to identify a protocol used for radio frequency communication between the NFCC and the remote NFC endpoint; and the radio frequency interface identifier is used to identify the radio frequency interface corresponding to the first configuration information; and that the second configuration information matches first configuration information of radio frequency communication to be initiated by the first NFC host includes that the radio frequency protocol identifier in the second configuration information is the same as the radio frequency protocol identifier in the first configuration information.

With reference to the ninth aspect or the first possible implementation manner of the ninth aspect, in a second possible implementation manner, the NFCC is further configured to, after the radio frequency interface is activated, receive a deactivate request command that is sent by the first NFC host or the second NFC host and used to deactivate the radio frequency interface; and if the NFCC further performs, under control of another NFC host, radio frequency communication with the remote NFC endpoint using a radio frequency protocol corresponding to the radio frequency interface, send a deactivate response message that includes a cause identifier to the first NFC host or the second NFC host without ending the radio frequency communication with the remote NFC endpoint, where the cause identifier is used to indicate that the NFCC does not end the radio frequency communication with the remote NFC endpoint.

According to a tenth aspect, a terminal device is provided and includes a first NFC host, a second NFC host, and an NFCC, where the first NFC host and the second NFC host are separately connected to the NFCC; the first NFC host is configured to send, to the NFCC, first configuration information of radio frequency communication to be initiated; the NFCC is configured to receive the first configuration information of the radio frequency communication to be initiated by the first NFC host, where the first configuration information is sent by the first NFC host; if the NFCC is in a non-idle state, determine whether second configuration information matches the first configuration information, where the second configuration is configuration information of radio frequency communication that the second NFC host performs with a remote NFC endpoint using the NFCC; and the NFCC is further configured to, if the second configuration information matches the first configuration information, activate a radio frequency interface corresponding to the first configuration information, so that the first NFC host performs the radio frequency communication with the remote NFC endpoint through the radio frequency interface.

In a first possible implementation manner of the tenth aspect, the first configuration information at least includes a radio frequency technology mode identifier used to identify a radio frequency technology and working mode adopted by the NFCC, a radio frequency protocol identifier used to identify a protocol used for radio frequency communication between the NFCC and the remote NFC endpoint, and a radio frequency interface identifier used to identify the radio frequency interface corresponding to the first configuration information; that the second configuration information matches the first configuration information includes that the radio frequency protocol identifier in the second configuration information is the same as the radio frequency protocol identifier in the first configuration information; and when determining whether the second configuration information matches the first configuration information, the NFCC is configured to, when the NFCC is in a non-idle and non-active state, determine whether the radio frequency technology mode identifier in the second configuration information is the same as the radio frequency technology mode identifier in the first configuration information; and if the radio frequency technology mode identifier in the second configuration information is the same as the radio frequency technology mode identifier in the first configuration information, after a state of the NFCC becomes an active state, determine whether the radio frequency protocol identifier in the second configuration information is the same as the radio frequency protocol identifier in the first configuration information; or when the NFCC is in an active state, determine whether the radio frequency protocol identifier in the second configuration information is the same as the radio frequency protocol identifier in the first configuration information.

With reference to the tenth aspect or the first possible implementation manner of the tenth aspect, in a second possible implementation manner, the NFCC is further configured to, after the radio frequency interface is activated, receive a deactivate request command that is sent by the first NFC host or the second NFC host and used to deactivate the radio frequency interface; and if the NFCC further performs, under control of another NFC host, radio frequency communication with the remote NFC endpoint using a radio frequency protocol corresponding to the radio frequency interface, send a deactivate response message that includes a cause identifier to the first NFC host or the second NFC host without ending the radio frequency communication with the remote NFC endpoint, where the cause identifier is used to indicate that the NFCC does not end the radio frequency communication with the remote NFC endpoint.

The embodiments of the present invention provide a radio frequency communication mechanism for an NFC device under a multi-host architecture. In the NFC device under a multi-host architecture, before initiating radio frequency communication with a remote NFC endpoint, a first NFC host can acquire second configuration information of radio frequency communication that a second NFC host has established with the remote NFC endpoint using an NFCC; and then, after determining that the second configuration information matches first configuration information of radio frequency communication to be initiated, the first NFC host requests the NFCC to activate a radio frequency interface corresponding to the first configuration information, so that the first NFC host can perform the radio frequency communication with the remote NFC endpoint using the NFCC. In the radio frequency communication mechanism, the first NFC host and the second NFC host can simultaneously control radio frequency communication between the NFCC and the remote NFC endpoint, which avoids a conflict problem; and the first NFC host can also omit to request the NFCC to initiate a radio frequency discovery process, and perform radio frequency communication with the remote NFC endpoint using the NFCC.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art on a basis of the embodiments of the present invention without creative efforts shall fall within the protection scope of the present invention.

Ordinal number words such as "first" and "second" mentioned in the embodiments of the present invention should be construed as being used only for differentiation, unless the ordinal numbers really express the meaning of order according to the context.

Figure 1:
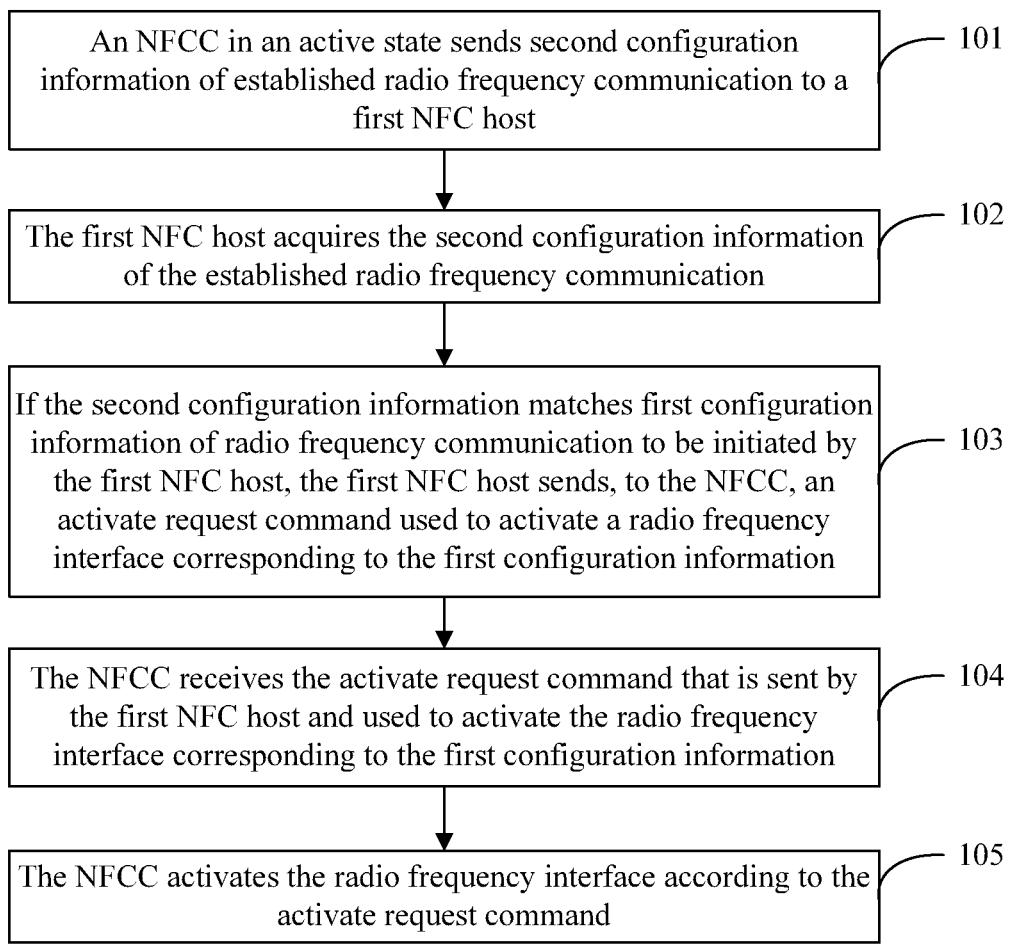
FIG. 1 is a flowchart of a method for NFC radio frequency communication according to an embodiment of the present invention.

FIG. 1 is a flowchart of a method for NFC radio frequency communication according to an embodiment of the present invention; and as shown in FIG. 1, the method includes the following steps:

Step 101: An NFCC in an active state sends second configuration information of established radio frequency communication to a first NFC host, where the established radio frequency communication is radio frequency communication that a second NFC host performs with a remote NFC endpoint using the NFCC.

An NFC device includes mainly a DH, an NFCC, and an SE. The DH is responsible for management of the NFCC; the NFCC is responsible for physical transmission of data through a radio frequency interface and an antenna; and the SE can provide a secure executing environment for an NFC application program. In a multi-host architecture, both the DH and the SE can control the NFCC to perform radio frequency communication, that is, both the DH and the SE can be an NFC host. The NFC host described in the embodiments of the present invention includes the DH and the SE, that is, the NFC host may be a DH or an SE. A remote NFC endpoint may be an NFC device, and may also indicate an NFC tag.

The NFCC in an active state may send the second configuration information to the first NFC host according to a request of the first NFC host.

In the NFC device, the NFCC may have a plurality of states, for example, the following seven states: 1. Idle state (RFST_IDLE), where, after the DH and the NFCC are successfully initialized, a radio frequency communication state of the NFCC is idle; 2. State of executing radio frequency discovery (RFST_DISCOVERY), which is a state where the NFCC initiates a radio frequency discovery process according to a radio frequency discovery command and executes the radio frequency discovery process according to discovery configuration; 3. State of discovering a plurality of remote devices (remote NFC endpoint) (RFST_W4_ALL_DISCOVERIES), which is a state where the NFCC discovers a plurality of remote devices or one remote device; 4. State of selecting by a host (RFST_W4_HOST_SELECT), which is a state of waiting for the NFC host to select a remote device after the NFCC discovers a plurality of remote devices; 5. Polling state after activation (RFST_POLL_ACTIVE), which is a state where the NFCC is activated and is in a polling mode; 6. Listening state after activation (RFST_LISTEN_ACTIVE), which is a state where the NFCC is activated and is in a listening mode; and 7. Sleeping state (RFST_LISTEN_SLEEP), where, when the NFCC in the listening state after being activated fails to obtain any content by means of listening for a long time, the NFCC turns into the sleeping state. Among the foregoing seven states, states 2 to 7 are non-idle states, and states 5 and 6 are active states.

When the NFCC performs radio frequency communication with the remote NFC endpoint, the NFCC is in an active state.

Step 102: The first NFC host acquires the second configuration information of the established radio frequency communication.

In this embodiment, the second NFC host has established radio frequency communication with the remote NFC endpoint using the NFCC, that is, the NFCC, under control of the second NFC host, has established radio frequency communication with the remote NFC endpoint.

After the second NFC host establishes radio frequency communication with the remote NFC endpoint using the NFCC, the established radio frequency communication corresponds to configuration information, that is, the second configuration information. The configuration information at least includes a radio frequency protocol identifier, where the radio frequency protocol identifier is used to identify a protocol used for radio frequency communication between the NFCC and the remote NFC endpoint. The radio frequency protocol identifier included in the second configuration information is used to identify a protocol used for radio frequency communication that is performed between the NFCC and the remote NFC endpoint under control of the second NFC host, that is, a protocol that is used by the second NFC host to perform radio frequency communication with the remote NFC endpoint using the NFCC.

The first NFC host may request, from the NFCC, the second configuration information of the currently established radio frequency communication according to a requirement. Alternatively, the first NFC host may also acquire the second configuration information of the currently established radio frequency communication in another manner. For example, the first NFC host acquires the second configuration information of the currently established radio frequency communication from another host or server.

Step 103: If the second configuration information matches first configuration information of radio frequency communication to be initiated by the first NFC host, the first NFC host sends, to the NFCC, an activate request command used to activate a radio frequency interface corresponding to the first configuration information.

After acquiring the second configuration information, the first NFC host determines whether the second configuration information matches the first configuration information, and may determine whether the radio frequency protocol identifier in the second configuration information is the same as a radio frequency protocol identifier in the first configuration information; and if the radio frequency protocol identifier in the second configuration information is the same as the radio frequency protocol identifier in the first configuration information, the second configuration information matches the first configuration information.

If the second configuration information matches the first configuration information, the first NFC host does not need to control the NFCC to perform a radio frequency discovery process, but needs only to request the NFCC to activate a corresponding radio frequency interface, so as to perform radio frequency communication with a remote NFC endpoint using the NFCC, where the remote NFC endpoint is a remote NFC endpoint with which the NFCC performs radio frequency communication under control of the second NFC host. Therefore, after determining that the second configuration information matches the first configuration information, the first NFC host sends, to the NFCC, an activate request command that is used to request the NFCC to activate a radio frequency interface corresponding to the first configuration information.

The radio frequency interface (RF Interface) is a logical entity, which allows the DH to perform communication with a remote NFC endpoint using a certain protocol implemented on the NFCC; the radio frequency interface may be an NFC data exchange protocol (NFC-DEP) radio frequency interface, an International Organization for Standardization (ISO) data exchange protocol or ISO14443 data exchange protocol (ISO-DEP) radio frequency interface, a Frame radio frequency interface, a logical link control protocol (LLCP) Low radio frequency interface, or the like.

The first configuration information includes a radio frequency interface identifier, that is, when the first NFC host is to initiate radio frequency communication, the first NFC host may learn in advance the radio frequency interface to be used. The activate request command that the first NFC host sends to the NFCC may include an identifier of the radio frequency interface to be used, that is, an identifier of the radio frequency interface corresponding to the first configuration information.

Step 104: The NFCC receives the activate request command that is sent by the first NFC host and used to activate the radio frequency interface corresponding to the first configuration information.

Step 105: The NFCC activates the radio frequency interface according to the activate request command.

After receiving the activate request command that is sent by the first NFC host, the NFCC activates the radio frequency interface corresponding to the first configuration information. After the NFCC activates the radio frequency interface, the first NFC host may control the NFCC to perform radio frequency communication with the remote NFC endpoint, that is, the first NFC host may perform the radio frequency communication with the remote NFC endpoint using the NFCC.

The embodiment of the present invention provides a radio frequency communication mechanism for an NFC device under a multi-host architecture. In the NFC device under a multi-host architecture, before initiating radio frequency communication with a remote NFC endpoint, a first NFC host can acquire second configuration information of radio frequency communication that a second NFC host has established with the remote NFC endpoint using an NFCC; and then, after determining that the second configuration information matches first configuration information of radio frequency communication to be initiated, the first NFC host requests the NFCC to activate a radio frequency interface corresponding to the first configuration information, so that the first NFC host can perform the radio frequency communication with the remote NFC endpoint using the NFCC. In the radio frequency communication mechanism, the first NFC host and the second NFC host can simultaneously control radio frequency communication between the NFCC and the remote NFC endpoint, which avoids a conflict problem; and the first NFC host can also omit to request the NFCC to initiate a radio frequency discovery process, and perform radio frequency communication with the remote NFC endpoint using the NFCC.

Figure 2:
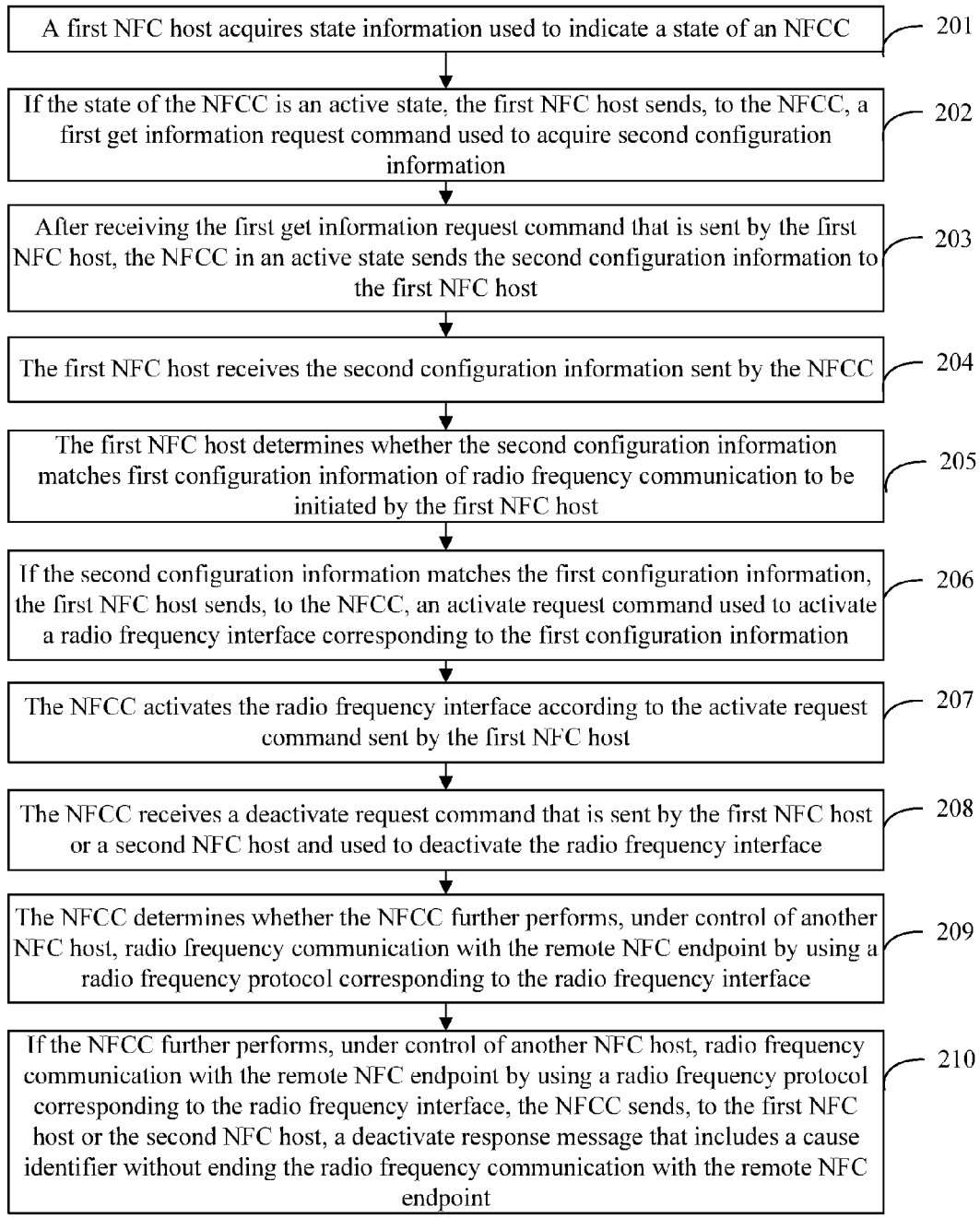
FIG. 2 is a flowchart of another method for NFC radio frequency communication according to an embodiment of the present invention.

FIG. 2 is a flowchart of another method for NFC radio frequency communication according to an embodiment of the present invention; and on a basis of the embodiment shown in FIG. 1, as shown in FIG. 2, the method includes the following steps:

Step 201: A first NFC host acquires state information used to indicate a state of an NFCC.

The NFC host may acquire the state information of the NFCC from the NFCC. For example, the NFC host may request current state information of the NFCC from the NFCC according to a requirement; or, the NFC host may configure the NFCC, so that the NFCC reports the state information to the NFC host when the state changes; or, the NFC host may also acquire the state information of the NFCC in another manner, for example, the NFC host acquires the state information of the NFCC from another host or server.

Step 202: If the state of the NFCC is an active state, the first NFC host sends, to the NFCC, a first get information request command used to acquire second configuration information. If the state of the NFCC is an active state, it indicates that the NFCC is performing radio frequency communication with a remote NFC endpoint under control of another NFC host at the moment, and configuration information corresponding to the radio frequency communication is the second configuration information. In this case, the first NFC host may request the second configuration information from the NFCC.

Step 203: After receiving the first get information request command that is sent by the first NFC host and used to acquire the second configuration information, the NFCC in an active state sends the second configuration information to the first NFC host.

Step 204: The first NFC host receives the second configuration information sent by the NFCC.

By performing steps 201 to 204, the first NFC host acquires the second configuration information. In another implementation manner, the foregoing steps 201 to 204 may be replaced with the following steps 201' to 203'.

Step 201': A first NFC host sends, to an NFCC, a second get information request command used to acquire state information and second configuration information, where the state information is used to indicate a state of the NFCC.

Step 202': After receiving the second get information request command that is sent by the first NFC host, the NFCC in an active state sends the state information and the second configuration information to the first NFC host.

After the NFCC receives the second get information request command, the NFCC may determine whether the NFCC has the second configuration information; and if the NFCC has the second configuration information, the NFCC sends the second configuration information to the first NFC host. If the NFCC has the second configuration information, the NFCC is currently in an active state. It should be noted that, when the NFCC receives the second get information request command, the NFCC may not be in an active state at the moment, that is, the NFCC may not be in a state of performing radio frequency communication with a remote NFC endpoint at the moment, and the NFCC does not have the second configuration information at the moment. In this case, the NFCC may wait until the NFCC turns to an active state, and then returns the second configuration information to the first NFC host.

When sending the second configuration information to the first NFC host, the NFCC may simultaneously send the current state information of the NFCC to the first NFC host.

Step 203': The first NFC host receives the state information and the second configuration information that are sent by the NFCC.

Alternatively, in another implementation manner, the foregoing steps 201 to 204 may be replaced with the following steps 201" to 203".

Step 201": A first NFC host sends, to an NFCC, a third get information request command used to acquire second configuration information.

Step 202": After receiving the third get information request command that is sent by the first NFC host, the NFCC in an active state sends the second configuration information to the first NFC host.

Step 203": The first NFC host receives the second configuration information that is sent by the NFCC in an active state.

Compared with steps 201' to 203', in steps 201" to 203", the first NFC host acquires the second configuration information only, and does not acquire the state information of the NFCC.

The first configuration information may at least include a radio frequency protocol identifier and a radio frequency interface identifier. The second configuration information may at least include a radio frequency protocol identifier. The radio frequency protocol identifier is used to identify a protocol used for radio frequency communication between the NFCC and the remote NFC endpoint; and the radio frequency interface identifier is used to identify the radio frequency interface corresponding to the first configuration information.

Step 205: The first NFC host determines whether the second configuration information matches first configuration information of radio frequency communication to be initiated by the first NFC host.

After the first NFC host acquires the second configuration information, if the first NFC host is to initiate radio frequency communication with the remote NFC endpoint using the NFCC, the first NFC host may determine whether the second configuration information matches the first configuration information of the radio frequency communication to be initiated by the first NFC host.

If the radio frequency protocol identifier in the second configuration information is the same as the radio frequency protocol identifier in the first configuration information, the second configuration information matches the first configuration information; that is, if a radio frequency protocol that a second NFC host uses for radio frequency communication with the remote NFC endpoint using the NFCC is the same as a radio frequency protocol that the first NFC host uses for radio frequency communication with the remote NFC endpoint using the NFCC, the second configuration information matches the first configuration information.

Step 206: If the second configuration information matches the first configuration information, the first NFC host sends, to the NFCC, an activate request command used to activate a radio frequency interface corresponding to the first configuration information.

Step 207: The NFCC activates the radio frequency interface according to the activate request command sent by the first NFC host.

Step 208: The NFCC receives a deactivate request command that is sent by the first NFC host or the second NFC host and used to deactivate the radio frequency interface.

After the first NFC host finishes performing radio frequency communication with the remote NFC endpoint using the NFCC, the first NFC host may instruct the NFCC to deactivate the radio frequency interface used by the first NFC host.

Similarly, after the second NFC host finishes performing radio frequency communication with the remote NFC endpoint, the second NFC host may also instruct the NFCC to deactivate the radio frequency interface used by the second NFC host.

Step 209: The NFCC determines whether the NFCC further performs, under control of another NFC host, radio frequency communication with the remote NFC endpoint using a radio frequency protocol corresponding to the radio frequency interface.

In the radio frequency communication mechanism provided by this embodiment, the first NFC host and the second NFC host may use a same radio frequency protocol, and simultaneously perform radio frequency communication with the remote NFC endpoint using the NFCC. Therefore, after the NFCC receives a deactivate request command that is sent by an NFC host, the NFCC determines whether the NFCC further performs, under control of another NFC host, radio frequency communication with the remote NFC endpoint using the radio frequency protocol corresponding to the radio frequency interface.

Step 210: If the NFCC further performs, under control of another NFC host, radio frequency communication with the remote NFC endpoint using a radio frequency protocol corresponding to the radio frequency interface, the NFCC sends, to the first NFC host or the second NFC host, a deactivate response message that includes a cause identifier without ending the radio frequency communication with the remote NFC endpoint, where the cause identifier is used to indicate that the NFCC does not end the radio frequency communication with the remote NFC endpoint.

By performing steps 208 to 210, that a radio frequency link being used by another host is released in a case that the radio frequency interface is deactivated may be avoided, where the radio frequency link is a radio frequency link between the NFCC and the remote NFC endpoint.

The embodiment of the present invention provides a radio frequency communication mechanism for an NFC device under a multi-host architecture. In the NFC device under a multi-host architecture, before initiating radio frequency communication with a remote NFC endpoint, a first NFC host can acquire second configuration information of radio frequency communication that a second NFC host has established with the remote NFC endpoint using an NFCC; and then, after determining that the second configuration information matches first configuration information of radio frequency communication to be initiated, the first NFC host requests the NFCC to activate a radio frequency interface corresponding to the first configuration information, so that the first NFC host can perform the radio frequency communication with the remote NFC endpoint using the NFCC. In the radio frequency communication mechanism, the first NFC host and the second NFC host can simultaneously control radio frequency communication between the NFCC and the remote NFC endpoint, which avoids a conflict problem; and the first NFC host can also omit a process, such as radio frequency discovery and radio frequency configuration, when performing radio frequency communication with the remote NFC endpoint using the NFCC, thereby accelerating a radio frequency interface activating process. In the embodiment of the present invention, under the multi-host architecture, multiple NFC hosts are allowed to share one radio frequency link, thereby improving use efficiency of the radio frequency link.

Figure 3:
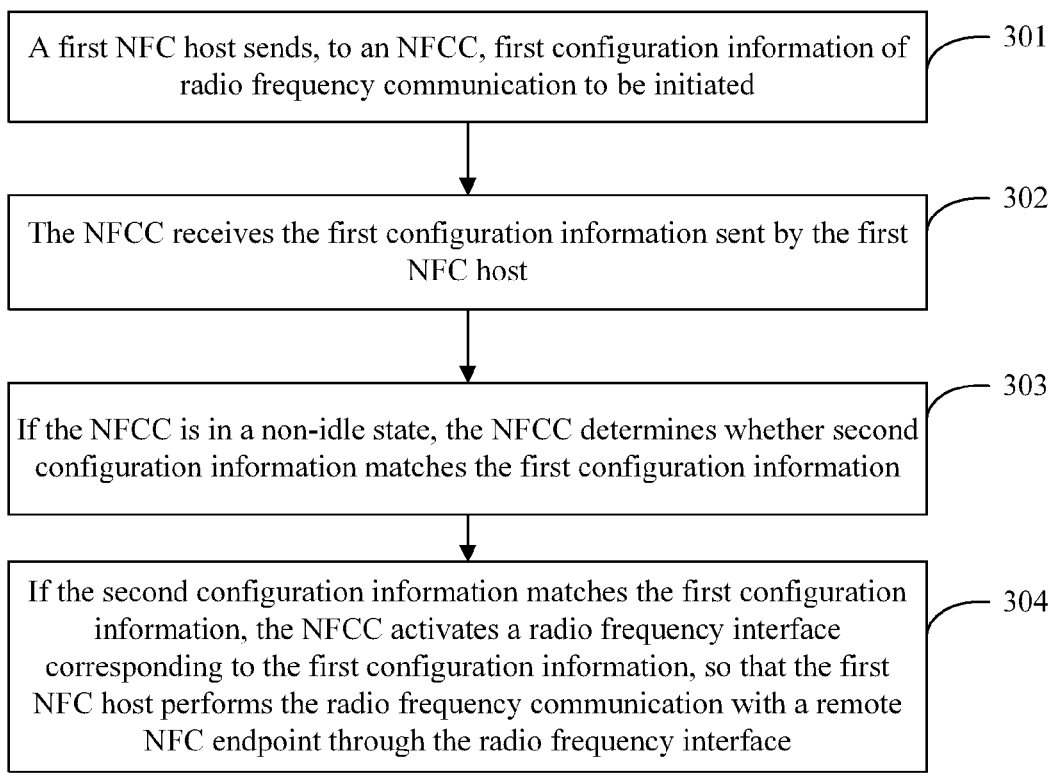
FIG. 3 is a flowchart of another method for NFC radio frequency communication according to an embodiment of the present invention.

FIG. 3 is a flowchart of another method for NFC radio frequency communication according to an embodiment of the present invention; and as shown in FIG. 3, the method includes the following steps:

Step 301: A first NFC host sends, to an NFCC, first configuration information of radio frequency communication to be initiated.

The NFC device in this embodiment is in a multi-host architecture, and at least includes a first NFC host, a second NFC host, and an NFCC.

When the first NFC host is to perform radio frequency communication with a remote NFC endpoint using the NFCC, the first NFC host may first send, to the NFCC, the first configuration information of the radio frequency communication to be initiated. The first configuration information may include a radio frequency protocol identifier, and the radio frequency protocol identifier is used to identify a radio frequency protocol used for the radio frequency communication to be initiated by the first NFC host.

Step 302: The NFCC receives the first configuration information sent by the first NFC host.

Step 303: If the NFCC is in a non-idle state, the NFCC determines whether second configuration information matches the first configuration information. The second configuration information is configuration information of radio frequency communication that the second NFC host performs with the remote NFC endpoint using the NFCC.

After receiving the first configuration information sent by the first NFC host, the NFCC determines a state of the NFCC. If the NFCC is in a non-idle state, it indicates that the NFCC is currently controlled by the second NFC host to perform radio frequency communication with the remote NFC endpoint. Therefore, when the NFCC is in a non-idle state, the NFCC can acquire the second configuration information. It should be noted that, when the NFCC is in an active state, the NFCC may acquire the second configuration information; and when the NFCC is in a non-idle state which is a non-active state, the NFCC may wait until the NFCC turns to an active state, and then acquire the second configuration information.

After the NFCC acquires the second configuration information, the NFCC may determine whether the second configuration information matches the first configuration information. If a radio frequency protocol identifier in the second configuration information is the same as the radio frequency protocol identifier in the first configuration information, the two pieces of configuration information are matched.

Step 304: If the second configuration information matches the first configuration information, the NFCC activates a radio frequency interface corresponding to the first configuration information, so that the first NFC host performs the radio frequency communication with a remote NFC endpoint through the radio frequency interface.

After determining that the second configuration information matches the first configuration information, the NFCC activates the radio frequency interface corresponding to the first configuration information, so that the first NFC host can perform radio frequency communication with the remote NFC endpoint through the radio frequency interface.

The embodiment of the present invention provides a radio frequency communication mechanism for an NFC device under a multi-host architecture. In the NFC device under a multi-host architecture, before initiating radio frequency communication with a remote NFC endpoint, a first NFC host can send, to an NFCC, first configuration information of radio frequency communication to be initiated; the NFCC acquires second configuration information of radio frequency communication that is being performed, and determines whether the first configuration information matches the second configuration information; after determining that the first configuration information matches the second configuration information, the NFCC activates a radio frequency interface corresponding to the first configuration information, so that the first NFC host can perform the radio frequency communication with the remote NFC endpoint using the NFCC. In the radio frequency communication mechanism, the first NFC host and a second NFC host can simultaneously control radio frequency communication between the NFCC and the remote NFC endpoint, which avoids a conflict problem; and the first NFC host can also omit to request the NFCC to initiate a radio frequency discovery process, and perform radio frequency communication with the remote NFC endpoint using the NFCC.

Figure 4:
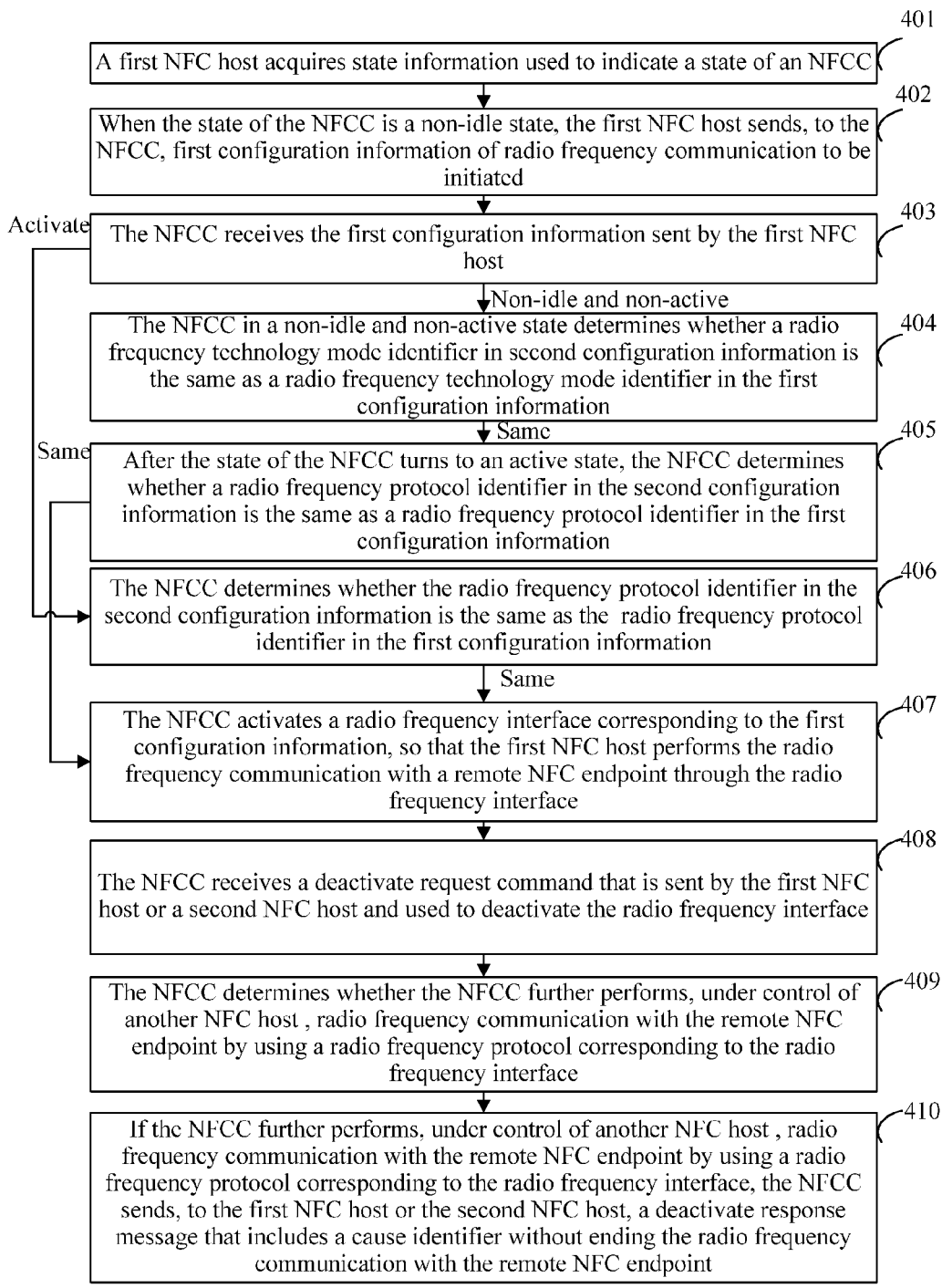
FIG. 4 is a flowchart of another method for NFC radio frequency communication according to an embodiment of the present invention.

FIG. 4 is a flowchart of another method for NFC radio frequency communication according to an embodiment of the present invention; and on a basis of the embodiment shown in FIG. 3, as shown in FIG. 4, the method includes the following steps:

Step 401: A first NFC host acquires state information used to indicate a state of an NFCC.

Step 402: When the state of the NFCC is a non-idle state, the first NFC host sends, to the NFCC, first configuration information of radio frequency communication to be initiated.

If the NFCC is in a non-idle state, it indicates that the NFCC is currently controlled by a second NFC host to perform radio frequency communication with a remote NFC endpoint. Therefore, under control of the second NFC host, a radio frequency link between the NFCC and the remote NFC endpoint may possibly be used by the first NFC host. Therefore, the first NFC host sends the first configuration information to the NFCC.

The first configuration information at least includes a radio frequency technology mode identifier, a radio frequency protocol identifier, and a radio frequency interface identifier. The radio frequency technology mode identifier is used to identify a radio frequency technology and working mode adopted by the NFCC, the radio frequency protocol identifier is used to identify a protocol used for radio frequency communication between the NFCC and the remote NFC endpoint, and the radio frequency interface identifier is used to identify a radio frequency interface corresponding to the first configuration information.

If the state of the NFCC is an idle state, it indicates that the NFCC is not occupied by another NFC host at the moment. Therefore, the first NFC host may initiate a radio frequency discovery request, requesting the NFCC to initiate radio frequency discovery, so as to finally implement radio frequency communication of the first NFC host with the remote NFC endpoint using the NFCC.

In another implementation manner, the foregoing steps 401 to 402 may be replaced by step 401'.

Step 401': A first NFC host sends, directly to an NFCC, first configuration information of radio frequency communication to be initiated. The first NFC host may not acquire a state of the NFCC, but sends the first configuration information directly to the NFCC.

Step 403: The NFCC receives the first configuration information sent by the first NFC host; if the NFCC is in a non-idle and non-active state, step 404 is performed; and if the NFCC is in an active state, step 406 is performed.

Step 404: The NFCC in a non-idle and non-active state determines whether a radio frequency technology mode identifier in second configuration information is the same as the radio frequency technology mode identifier in the first configuration information; if the radio frequency technology mode identifier in second configuration information is the same as the radio frequency technology mode identifier in the first configuration information, step 405 is performed; and if the radio frequency technology mode identifier in second configuration information is different from the radio frequency technology mode identifier in the first configuration information, the process is ended.

In this step, the NFCC is in a non-idle and non-active state. In this case, the radio frequency communication has not been completely established between the NFCC and the remote NFC endpoint, and the second configuration information does not include a radio frequency protocol identifier. Therefore, a predetermination may be first performed at the moment to compare whether the radio frequency technology mode identifiers are the same; if the radio frequency technology mode identifiers are different, the radio frequency protocol identifiers are definitely different, that is, the first configuration information definitely does not match the second configuration information, and in this case, the process may be ended; and if the radio frequency technology mode identifiers are the same, the radio frequency protocol identifiers are possibly the same, and, in this case, subsequent steps are then performed.

Step 405: After the state of the NFCC turns to an active state, the NFCC determines whether a radio frequency protocol identifier in the second configuration information is the same as the radio frequency protocol identifier in the first configuration information; if the radio frequency technology mode identifier in second configuration information is the same as the radio frequency technology mode identifier in the first configuration information, step 407 is performed; and if the radio frequency technology mode identifier in second configuration information is different from the radio frequency technology mode identifier in the first configuration information, the process is ended.

After the NFCC is in a non-idle and non-active state, the non-idle and non-active state may turn to an active state. When the NFCC is in an active state, the second configuration information includes a radio frequency protocol identifier, and in this case, the radio frequency protocol identifiers can be compared.

Step 406: The NFCC determines whether the radio frequency interface identifier in the second configuration information is the same as the radio frequency interface identifier in the first configuration information; if the radio frequency technology mode identifier in second configuration information is the same as the radio frequency technology mode identifier in the first configuration information, step 407 is performed; and if the radio frequency technology mode identifier in second configuration information is different from the radio frequency technology mode identifier in the first configuration information, the process is ended.

When the radio frequency protocol identifier in the second configuration information is the same as the radio frequency protocol identifier in the first configuration information, it indicates that the second configuration information matches the first configuration information.

Step 407: The NFCC activates the radio frequency interface corresponding to the first configuration information, so that the first NFC host performs radio frequency communication with the remote NFC endpoint through the radio frequency interface.

Step 408: The NFCC receives a deactivate request command that is sent by the first NFC host or the second NFC host and used to deactivate the radio frequency interface.

Step 409: The NFCC determines whether the NFCC further performs, under control of another NFC host, radio frequency communication with the remote NFC endpoint using a radio frequency protocol corresponding to the radio frequency interface.

Step 410: If the NFCC further performs, under control of another NFC host, radio frequency communication with the remote NFC endpoint using a radio frequency protocol corresponding to the radio frequency interface, the NFCC sends, to the first NFC host or the second NFC host, a deactivate response message that includes a cause identifier without ending the radio frequency communication with the remote NFC endpoint, where the cause identifier is used to indicate that the NFCC does not end the radio frequency communication with the remote NFC endpoint.

By performing steps 408 to 410, that a radio frequency link being used by another host is released in a case that the radio frequency interface is deactivated may be avoided, where the radio frequency link is a radio frequency link between the NFCC and the remote NFC endpoint.

The embodiment of the present invention provides a radio frequency communication mechanism for an NFC device under a multi-host architecture. In the NFC device under a multi-host architecture, before initiating radio frequency communication with a remote NFC endpoint, a first NFC host can send, to an NFCC, first configuration information of radio frequency communication to be initiated; the NFCC acquires second configuration information of radio frequency communication that is being performed, and determines whether the first configuration information matches the second configuration information; after determining that the first configuration information matches the second configuration information, the NFCC activates a radio frequency interface corresponding to the first configuration information, so that the first NFC host performs the radio frequency communication with the remote NFC endpoint using the NFCC. In the radio frequency communication mechanism, the first NFC host and a second NFC host can simultaneously control radio frequency communication between the NFCC and the remote NFC endpoint, which avoids a conflict problem; and the first NFC host can also omit a process, such as radio frequency discovery and radio frequency configuration, when performing radio frequency communication with the remote NFC endpoint using the NFCC, thereby accelerating a radio frequency interface activating process. In the embodiment of the present invention, under the multi-host architecture, multiple NFC hosts are allowed to share one radio frequency link, thereby improving use efficiency of the radio frequency link.

Figure 5A:
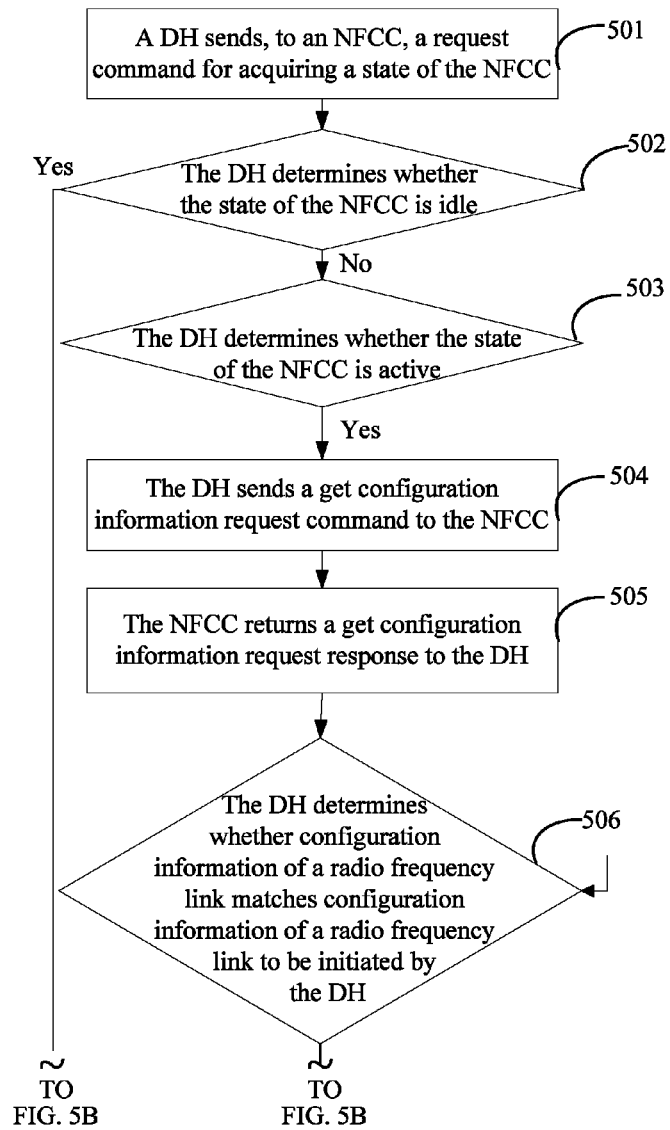
FIG. 5A and FIG. 5B is a flowchart of another method for NFC radio frequency communication according to an embodiment of the present invention.
Figure 5B:
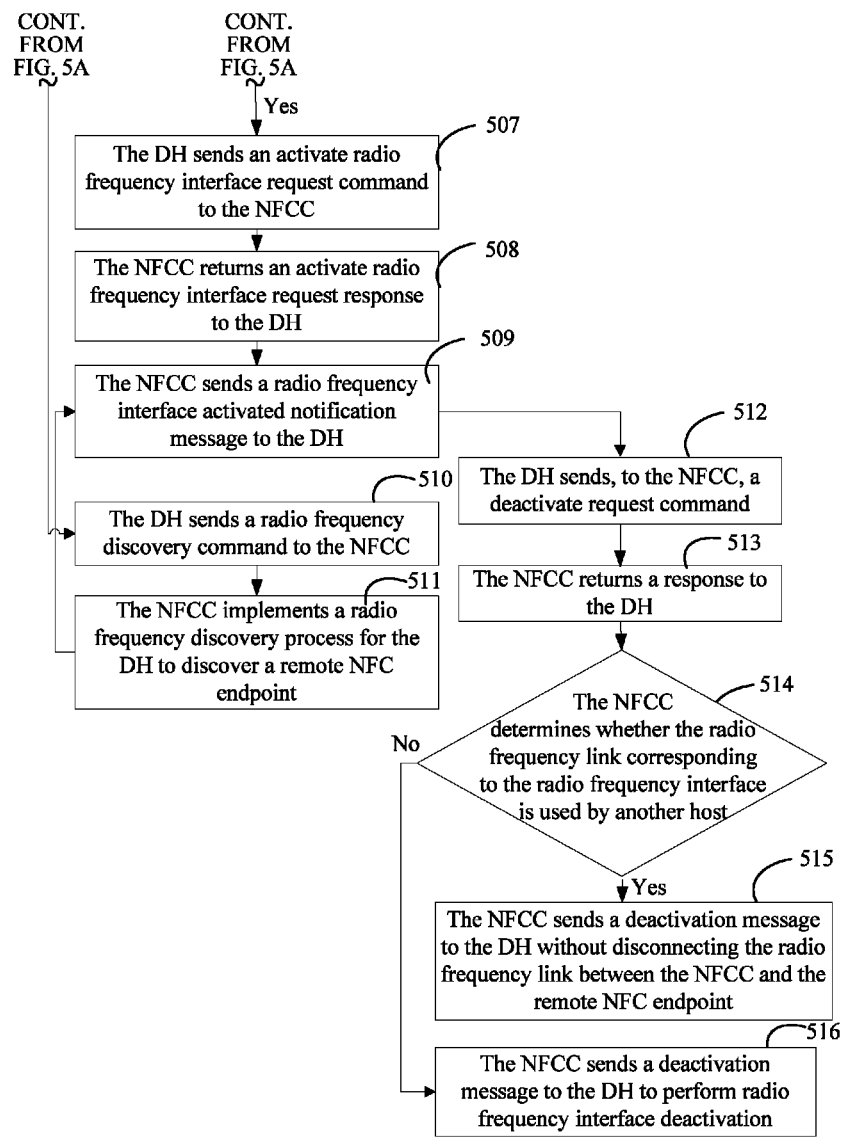

FIG. 5A and FIG. 5B is a flowchart of another method for NFC radio frequency communication according to an embodiment of the present invention; and on a basis of the embodiments shown in FIG. 1 and FIG. 2, as shown in FIG. 5A and FIG. 5B, the method includes the following steps:

Step 501: A DH sends, to an NFCC, a get NFCC state request command, which is used to acquire a current running state of the NFCC.

In the embodiment of the present invention, it is assumed that the DH serves as a first NFC host and an SE serves as a second NFC host.

Step 502: The DH determines whether the current state of the NFCC is an idle state (RFST_IDLE); if the radio frequency technology mode identifier in second configuration information is the same as the radio frequency technology mode identifier in the first configuration information, step 510 is performed; and if the radio frequency technology mode identifier in second configuration information is different from the radio frequency technology mode identifier in the first configuration information, step 503 is performed.

Step 503: The DH determines whether the current state of the NFCC is an active state; if the radio frequency technology mode identifier in second configuration information is the same as the radio frequency technology mode identifier in the first configuration information, which indicates that the NFCC has established, under control of an SE, a radio frequency link with a remote NFC endpoint, and step 504 is performed; and if the radio frequency technology mode identifier in second configuration information is different from the radio frequency technology mode identifier in the first configuration information, the process is ended.

Active states include a polling state after activation (RFST_POLL_ACTIVE) and a listening state after activation (RFST_LISTEN_ACTIVE).

Step 504: The DH sends, to the NFCC, a get configuration information request command (RF_INTF_GET_INFO_CMD) used to acquire configuration information of the radio frequency link that the NFCC currently establishes with the remote NFC endpoint, where the configuration information of the radio frequency link that the NFCC establishes with the remote NFC endpoint is equivalent to the configuration information of the radio frequency communication that the NFCC establishes with the remote NFC endpoint as described in other embodiments.

Step 505: After receiving the get configuration information request command from the DH, the NFCC returns, to the DH, a get configuration information request response (RF_INTF_GET_INFO_RSP), which carries the configuration information of the radio frequency link, where the configuration information may at least include a radio frequency protocol identifier.

Step 506: The DH determines whether the configuration information of the radio frequency link matches configuration information of a radio frequency link to be initiated by the DH; if the radio frequency technology mode identifier in second configuration information is the same as the radio frequency technology mode identifier in the first configuration information, step 507 is performed; and if the radio frequency technology mode identifier in second configuration information is different from the radio frequency technology mode identifier in the first configuration information, the process is ended.

Step 507: The DH sends, to the NFCC, an activate radio frequency interface request command (RF_INTF_ACTIVATE_NTF_CMD) used to request activation of a radio frequency interface of the NFCC, where the radio frequency interface is a radio frequency interface corresponding to the radio frequency link that the DH is to initiate.

Step 508: The NFCC returns, to the DH, an activate radio frequency interface request response (RF_INTF_ACTIVATE_NTF_RSP), where a status code may be set to 0x00, indicating that the NFCC successfully receives the request of the DH; and step 509 is performed.

Step 509: The NFCC sends, to the DH, a radio frequency interface activated notification message (RF_INTF_ACTIVATED_NTF), indicating that the radio frequency interface has been activated; and the process is ended.

Step 510: The DH sends a radio frequency discovery command (RF_DISCOVERY_CMD) to the NFCC, requesting the NFCC to initiate a radio frequency discovery process, which is used to discover a remote NFC endpoint; and step 511 is performed.

Step 511: The NFCC implements a radio frequency discovery process for the DH to discover a remote NFC endpoint; and step 509 is performed. The radio frequency discovery process includes radio frequency discovery and radio frequency configuration.

After step 509, the embodiment of the present invention may further include the following steps:

Step 512: The DH sends, to the NFCC, a deactivate request command (RF_DEACTIVATE_CMD) used to request the NFCC to deactivate the radio frequency interface.

After the radio frequency communication between the DH and the remote NFC endpoint is complete, the DH may request the NFCC to deactivate the corresponding radio frequency interface.

Step 513: The NFCC returns a response (RF_DEACTIVATE_RSP) to the DH, where the response message carries a status code 0x00, which may be used to indicate an acknowledgment that the deactivate request command is received.

Step 514: The NFCC determines whether the radio frequency link corresponding to the radio frequency interface is used by another host; if the radio frequency technology mode identifier in second configuration information is the same as the radio frequency technology mode identifier in the first configuration information, step 515 is performed; and if the radio frequency technology mode identifier in second configuration information is different from the radio frequency technology mode identifier in the first configuration information, step 516 is performed.

Step 515: The NFCC sends a deactivation message (RF_DEACTIVATE_NTF) to the DH, a reason field of which may be set to 0x04, where 0x04 is used to indicate that the radio frequency link corresponding to the radio frequency interface which the DH requests to deactivate is still used by another host, in which case, the NFCC does not disconnect the radio frequency link between the NFCC and the remote NFC endpoint, so that the another NFC host can still use the radio frequency link; and the process is ended.

Step 516: The NFCC sends a deactivation message (RF_DEACTIVATE_NTF) to the DH to perform radio frequency interface deactivation, a reason field of which may be set to 0x00, indicating that the NFCC implements deactivation of the radio frequency interface; and the process is ended.

In the radio frequency communication mechanism provided by the embodiment of the present invention, a DH and an SE can simultaneously control radio frequency communication between an NFCC and a remote NFC endpoint, which avoids a conflict problem; and the DH can also omit a process, such as radio frequency discovery and radio frequency configuration, when performing radio frequency communication with the remote NFC endpoint using the NFCC, thereby accelerating a radio frequency interface activating process. In the embodiment of the present invention, under the multi-host architecture, multiple NFC hosts are allowed to share one radio frequency link, thereby improving use efficiency of the radio frequency link.

Figure 6:
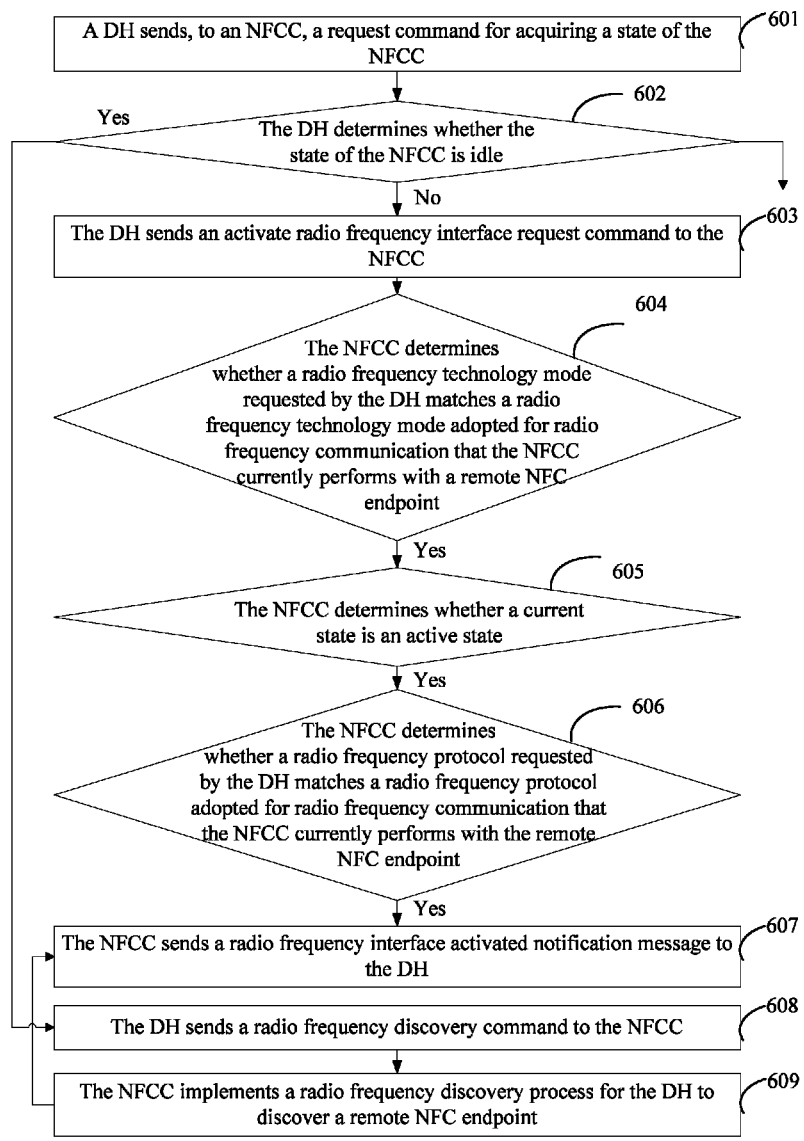
FIG. 6 is a flowchart of another method for NFC radio frequency communication according to an embodiment of the present invention.

FIG. 6 is a flowchart of another method for NFC radio frequency communication according to an embodiment of the present invention; and on a basis of the embodiments shown in FIG. 3 and FIG. 4, as shown in FIG. 6, the method includes the following steps:

Step 601: A DH sends, to an NFCC, a get NFCC state request command, which is used to acquire a current running state of the NFCC.

Step 602: The DH determines whether the current state of the NFCC is an idle state (RFST_IDLE); if the radio frequency technology mode identifier in second configuration information is the same as the radio frequency technology mode identifier in the first configuration information, step 608 is performed; and if the radio frequency technology mode identifier in second configuration information is different from the radio frequency technology mode identifier in the first configuration information, step 603 is performed.

Step 603: The DH sends an activate radio frequency interface request command (RF_INTF_ACTIVATE_NTF_CMD) to the NFCC, carrying configuration information of a radio frequency interface that the DH requests, where the configuration information of the radio frequency interface is equivalent to configuration information of a radio frequency interface to be initiated by the DH.

The configuration information may include a radio frequency technology mode identifier, a radio frequency protocol identifier, and a radio frequency interface identifier. The radio frequency technology mode, for example, includes a technology mode combining an active mode (or a passive mode) and listening (or polling).

Step 604: The NFCC determines whether the radio frequency technology mode requested by the DH matches a radio frequency technology mode adopted for radio frequency communication that the NFCC currently performs with a remote NFC endpoint; if the radio frequency technology mode identifier in second configuration information is the same as the radio frequency technology mode identifier in the first configuration information, step 605 is performed; and if the radio frequency technology mode identifier in second configuration information is different from the radio frequency technology mode identifier in the first configuration information, the process is ended.

If the two radio frequency technology modes are the same, the two radio frequency technology modes match each other.

Step 605: The NFCC determines whether the current state of the NFCC is an active state; if the radio frequency technology mode identifier in second configuration information is the same as the radio frequency technology mode identifier in the first configuration information, it indicates that the NFCC is in a polling or listening active state, that is, the NFCC has established a radio frequency link with the remote NFC endpoint, and step 606 is performed; and if the radio frequency technology mode identifier in second configuration information is different from the radio frequency technology mode identifier in the first configuration information, the NFCC waits until the NFCC enters an active state, and then step 606 is performed.

Step 606: The NFCC determines whether a radio frequency protocol requested by the DH matches a radio frequency protocol adopted for the radio frequency communication that the NFCC currently performs with the remote NFC endpoint; if the radio frequency technology mode identifier in second configuration information is the same as the radio frequency technology mode identifier in the first configuration information, step 607 is performed; and if the radio frequency technology mode identifier in second configuration information is different from the radio frequency technology mode identifier in the first configuration information, the process is ended.

It should be noted that, if the NFCC is already in an active state when the NFCC receives the activate radio frequency interface request command in step 603, step 604 and step 605 may not be performed, and step 606 is directly performed.

Step 607: The NFCC sends, to the DH, a radio frequency interface activated notification message (RF_INTF_ACTIVATED_NTF), indicating that the radio frequency interface has been activated; and the process is ended. At this time, the DH can perform communication with the remote NFC endpoint through the activated radio frequency interface.

Step 608: The DH sends, to the NFCC, a radio frequency discovery command (RF_DISCOVERY_CMD), requesting the NFCC to initiate a radio frequency discovery process used to discover a remote NFC device; and step 609 is performed.

Step 609: The NFCC implements a radio frequency discovery process for the DH to discover a remote NFC endpoint; and step 607 is performed.

In the radio frequency communication mechanism provided by the embodiment of the present invention, a first NFC host and a second NFC host can simultaneously control radio frequency communication between an NFCC and a remote NFC endpoint, which avoids a conflict problem; and the first NFC host can also omit a process, such as radio frequency discovery and radio frequency configuration, when performing radio frequency communication with the remote NFC endpoint using the NFCC, thereby accelerating a radio frequency interface activating process. In the embodiment of the present invention, under the multi-host architecture, multiple NFC hosts are allowed to share one radio frequency link, thereby improving use efficiency of the radio frequency link.

Figure 7:
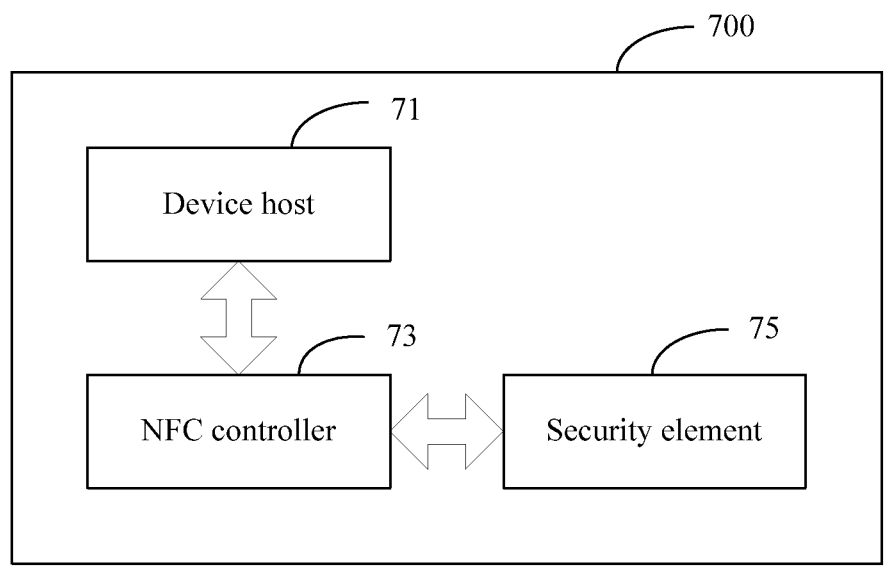
FIG. 7 is a schematic structural diagram of a terminal device according to an embodiment of the present invention.

FIG. 7 is a schematic structural diagram of a terminal device 700 according to an embodiment of the present invention. As shown in FIG. 7, the terminal device 700 includes a device host 71, an NFC controller 73, and at least one security element 75, where the device host 71 and the security element 75 are separately connected to the NFC controller 73.

The terminal device according to the embodiment of the present invention is a terminal device with an NFC function, which, for example, may be a printer, a TV set, a sound box, a mobile phone, or a camera.

The device host 71 is a device host of the terminal device and is responsible for management of the entire terminal device, including management of the NFC controller 73. If the terminal device is a mobile phone, the device host 71 may be a central processing unit (CPU) of the mobile phone. In a general situation, there is one device host 71 in the terminal device, without excluding a case that there are multiple device hosts 71.

The NFC controller 73 is responsible for physical transmission of data through a radio frequency interface and an antenna. In the terminal device 700, the NFC controller 73, for example, may be an NFC chip.

The security element 75 can provide a secure executing environment for an NFC application, and the security element 75, for example, may be in a plurality of physical forms, such as a universal integrated circuit card (UICC) or an SD card. If the terminal device is a mobile phone, the security element 75 may be a SIM card or an SD card. There may be multiple security elements 75.

The device host 71 and the security element 75 are both NFC hosts, and both may control the NFC controller 73 to perform a radio frequency communication process. Either the device host 71 or the security element 75 may be the first NFC host described in the foregoing method embodiments, and another NFC host or other NFC hosts are the foregoing second NFC hosts.

The device host 71 is configured to acquire second configuration information of established radio frequency communication, where the established radio frequency communication is radio frequency communication that the security element 75 performs with a remote NFC endpoint using the NFCC 73; and if the second configuration information matches first configuration information of radio frequency communication to be initiated by the device host 71, the device host 71 sends, to the NFCC 73, an activate request command used to activate a radio frequency interface corresponding to the first configuration information, so that the NFCC 73 activates the radio frequency interface for the device host 71 to perform the radio frequency communication with the remote NFC endpoint through the radio frequency interface.

The NFCC 73 is configured to, when the NFCC 73 is in an active state, send the second configuration information of the established radio frequency communication to the device host 71; receive the activate request command that is sent by the device host 71 and used to activate the radio frequency interface corresponding to the first configuration information; and activate the radio frequency interface according to the activate request command.

The first configuration information at least includes a radio frequency protocol identifier and a radio frequency interface identifier; and the second configuration information at least includes a radio frequency protocol identifier. The radio frequency protocol identifier is used to identify a protocol used for radio frequency communication between the NFCC 73 and the remote NFC endpoint; the radio frequency interface identifier is used to identify the radio frequency interface corresponding to the first configuration information; and that the second configuration information matches first configuration information of radio frequency communication to be initiated by the device host 71 includes that the radio frequency protocol identifier in the second configuration information is the same as the radio frequency protocol identifier in the first configuration information.

Further, a specific process that the device host 71 acquires the second configuration information of the established radio frequency communication may include the device host 71 acquires state information used to indicate a state of the NFCC 73; if the state of the NFCC 73 is an active state, the device host 71 sends, to the NFCC 73, a first get information request command used to acquire the second configuration information; and the device host 71 receives the second configuration information sent by the NFCC 73; or the device host 71 sends, to the NFCC 73, a second get information request command used to acquire state information and the second configuration information; and the device host 71 receives state information and the second configuration information that are sent by the NFCC 73 in an active state, where the state information is used to indicate a state of the NFCC; or the device host 71 sends, to the NFCC 73, a third get information request command used to acquire the second configuration information; and the device host 71 receives the second configuration information that is sent by the NFCC 73 in an active state.

Further, before sending the second configuration information of the established radio frequency communication to the device host 71, the NFCC 73 in an active state receives the first get information request command that is sent by the device host 71 and used to acquire the second configuration information; or, before sending the second configuration information of the established radio frequency communication to the device host 71, the NFCC 73 receives the second get information request command that is sent by the device host 71 and used to acquire the state information and the second configuration information, where the state information is used to indicate a state of the NFCC; or, before sending the second configuration information of the established radio frequency communication to the device host 71, the NFCC 73 receives the third get information request command that is sent by the device host 71 and used to acquire the second configuration information.

Further, the NFCC 73 may further be configured to, after the radio frequency interface is activated according to the activate request command, receive a deactivate request command that is sent by the device host 71 or the security element 75 and used to deactivate the radio frequency interface; if the NFCC 73 further performs, under control of another NFC host, radio frequency communication with the remote NFC endpoint using a radio frequency protocol corresponding to the radio frequency interface, the NFCC 73 sends, to the device host 71 or the security element 75, a deactivate response message that includes a cause identifier without ending the radio frequency communication with the remote NFC endpoint, where the cause identifier is used to indicate that the NFCC 73 does not end the radio frequency communication with the remote NFC endpoint.

Optionally, in another implementation manner, the device host 71, the NFCC 73, and the security element 75 may further have the following functions.

The device host 71 is configured to send, to the NFCC 73, first configuration information of radio frequency communication to be initiated.

The NFCC 73 is configured to receive the first configuration information of the radio frequency communication to be initiated by the device host 71, where the first configuration information is sent by the device host 71; and if the NFCC 73 is in a non-idle state, determine whether second configuration information matches the first configuration information, where the second configuration information is configuration information of radio frequency communication that the security element 75 performs with a remote NFC endpoint using the NFCC 73.

The NFCC 73 is further configured to, if the second configuration information matches the first configuration information, activate a radio frequency interface corresponding to the first configuration information, so that the device host 71 performs the radio frequency communication with the remote NFC endpoint through the radio frequency interface.

The first configuration information at least includes a radio frequency technology mode identifier used to identify a radio frequency technology and working mode adopted by the NFCC, a radio frequency protocol identifier used to identify a protocol used for radio frequency communication between the NFCC 73 and the remote NFC endpoint, and a radio frequency interface identifier used to identify the radio frequency interface corresponding to the first configuration information.

When determining whether the second configuration information matches the first configuration information, the NFCC 73 is configured to, when the NFCC 73 is in a non-idle and non-active state, determine whether a radio frequency technology mode identifier in the second configuration information is the same as the radio frequency technology mode identifier in the first configuration information; and if the radio frequency technology mode identifier in the second configuration information is the same as the radio frequency technology mode identifier in the first configuration information, after a state of the NFCC 73 becomes an active state, determine whether the radio frequency protocol identifier in the second configuration information is the same as the radio frequency protocol identifier in the first configuration information; or when the NFCC 73 is in an active state, determine whether the radio frequency protocol identifier in the second configuration information is the same as the radio frequency protocol identifier in the first configuration information.

It should be noted that the security element 75 may also have functions that the device host 71 has. When the security element 75 serves as a first NFC host, a second NFC host may be the device host 71, or may also be another security element 75.

Figure 8:
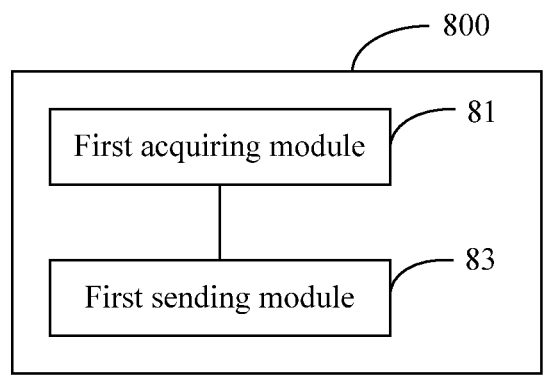
FIG. 8 is a schematic structural diagram of an NFC host according to an embodiment of the present invention.

FIG. 8 is a schematic structural diagram of an NFC host 800 according to an embodiment of the present invention. As shown in FIG. 8, the NFC host 800 includes a first acquiring module 81 and a first sending module 83, where the NFC host 800 is a first NFC host.

The first acquiring module 81 is configured to acquire second configuration information of established radio frequency communication, where the established radio frequency communication is radio frequency communication that a second NFC host performs with a remote NFC endpoint using a NFCC.

The first sending module 83 is configured to, if the second configuration information acquired by the first acquiring module 81 matches first configuration information of radio frequency communication to be initiated by the first NFC host, send, to the NFCC, an activate request command used to activate a radio frequency interface corresponding to the first configuration information, so that the NFCC activates the radio frequency interface and the first NFC host performs the radio frequency communication with the remote NFC endpoint through the radio frequency interface.

The first configuration information at least includes a radio frequency protocol identifier and a radio frequency interface identifier; and the second configuration information at least includes a radio frequency protocol identifier. The radio frequency protocol identifier is used to identify a protocol used for radio frequency communication between the NFCC and the remote NFC endpoint; and the radio frequency interface identifier is used to identify the radio frequency interface corresponding to the first configuration information. That the second configuration information acquired by the first acquiring module 81 matches first configuration information of radio frequency communication to be initiated by the first NFC host includes that the radio frequency protocol identifier in the second configuration information is the same as the radio frequency protocol identifier in the first configuration information.

Further, the first acquiring module 81 is configured to acquire state information used to indicate a state of the NFCC; if the state of the NFCC is an active state, send, to the NFCC, a first get information request command used to acquire the second configuration information, and receive the second configuration information sent by the NFCC; or the first acquiring module 81 is configured to send, to the NFCC, a second get information request command used to acquire state information and the second configuration information, and receive state information and the second configuration information that are sent by the NFCC in an active state, where the state information is used to indicate a state of the NFCC; or the first acquiring module 81 is configured to send, to the NFCC, a third get information request command used to acquire the second configuration information, and receive the second configuration information sent by the NFCC in an active state.

Figure 9:
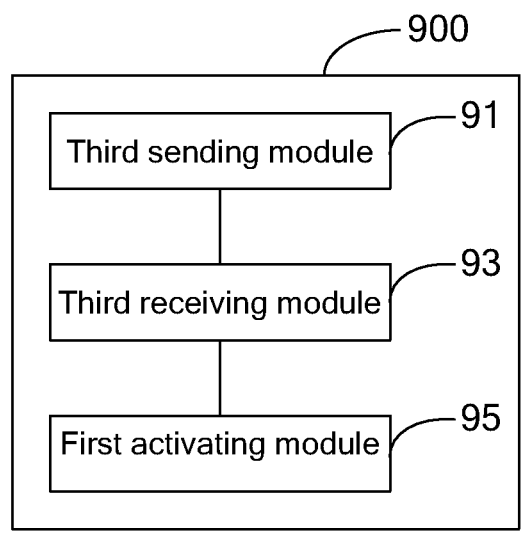
FIG. 9 is a schematic structural diagram of an NFCC according to an embodiment of the present invention.

FIG. 9 is a schematic structural diagram of an NFCC 900 according to an embodiment of the present invention, and as shown in FIG. 9, the NFCC 900 includes a third sending module 91, a third receiving module 93, and a first activating module 95.

The third sending module 91 is configured to, when the NFCC 900 is in an active state, send second configuration information of established radio frequency communication to a first NFC host, so that the first NFC host determines whether the second configuration information matches first configuration information of radio frequency communication to be initiated by the first NFC host, where the established radio frequency communication is radio frequency communication that a second NFC host performs with a remote NFC endpoint using the NFCC.

The third receiving module 93 is configured to receive an activate request command that is sent by the first NFC host and used to activate a radio frequency interface corresponding to the first configuration information, where the activate request command is sent by the first NFC host after the first NFC host determines that the second configuration information matches the first configuration information.

The first activating module 95 is configured to activate the radio frequency interface according to the activate request command received by the third receiving module 93.

Further, the third receiving module 93 is configured to, before the third sending module 91 sends the second configuration information of the established radio frequency communication to the first NFC host, when the NFCC is in an active state, receive a first get information request command that is sent by the first NFC host and used to acquire the second configuration information; or the third receiving module 93 is configured to, before the third sending module 91 sends the second configuration information of the established radio frequency communication to the first NFC host, receive a second get information request command that is sent by the first NFC host and used to acquire state information and the second configuration information, where the state information is used to indicate a state of the NFCC; or the third receiving module 93 is configured to, before the third sending module 91 sends the second configuration information of the established radio frequency communication to the first NFC host, receive a third get information request command that is sent by the first NFC host and used to acquire the second configuration information.

Further, the third receiving module 93 is further configured to, after the first activating module 95 activates the radio frequency interface, receive a deactivate request command that is sent by the first NFC host or the second NFC host and used to deactivate the radio frequency interface.

The third sending module 91 is further configured to, if the NFCC further performs, under control of another NFC host, radio frequency communication with the remote NFC endpoint using a radio frequency protocol corresponding to the radio frequency interface, send a deactivate response message that includes a cause identifier to the first NFC host or the second NFC host, where the cause identifier is used to indicate that the NFCC does not end the radio frequency communication with the remote NFC endpoint.

The NFC host 800 shown in FIG. 8 and the NFCC 900 shown in FIG. 9 are configured to implement the method in the embodiment shown in FIG. 1 or FIG. 2. For a specific working process and working principle, reference may be made to description of the embodiment shown in FIG. 1 or FIG. 2.

The embodiments shown in FIG. 8 and FIG. 9 provide a radio frequency communication mechanism for an NFC device under a multi-host architecture. In the NFC device under a multi-host architecture, before initiating radio frequency communication with a remote NFC endpoint, a first NFC host can acquire second configuration information of radio frequency communication that a second NFC host has established with the remote NFC endpoint using an NFCC; and then, after determining that the second configuration information matches first configuration information of radio frequency communication to be initiated, the first NFC host requests the NFCC to activate a radio frequency interface corresponding to the first configuration information, so that the first NFC host can perform the radio frequency communication with the remote NFC endpoint using the NFCC. In the radio frequency communication mechanism, the first NFC host and the second NFC host can simultaneously control radio frequency communication between the NFCC and the remote NFC endpoint, which avoids a conflict problem; and the first NFC host can also omit a process, such as radio frequency discovery and radio frequency configuration, when performing radio frequency communication with the remote NFC endpoint using the NFCC, thereby accelerating a radio frequency interface activating process. In the embodiment of the present invention, under the multi-host architecture, multiple NFC hosts are allowed to share one radio frequency link, thereby improving use efficiency of the radio frequency link.

Figure 10:
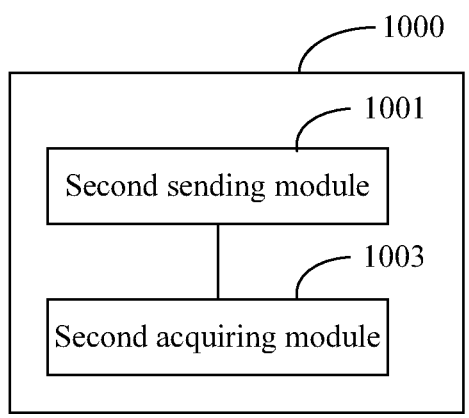
FIG. 10 is a schematic structural diagram of another NFC host according to an embodiment of the present invention.

FIG. 10 is a schematic structural diagram of another NFC host 100 according to an embodiment of the present invention. As shown in FIG. 10, the NFC host 1000 includes a second sending module 1001 and a second acquiring module 1003, where the NFC host 1000 is a first NFC host.

The second sending module 1001 is configured to send, to an NFCC, first configuration information of radio frequency communication to be initiated, so that the NFCC in an active state determines whether the first configuration information matches second configuration information, and after determining that the first configuration information matches the second configuration information, activates a radio frequency interface corresponding to the first configuration information, so that the first NFC host performs radio frequency communication with a remote NFC endpoint through the radio frequency interface, where the second configuration information is configuration information of radio frequency communication that a second NFC host performs with the remote NFC endpoint using the NFCC.

The second acquiring module 1003 is configured to acquire state information used to indicate a state of the NFCC.

Further, the second sending module 1001 is configured to send, directly to the NFCC, the first configuration information of the radio frequency communication to be initiated; or the second sending module 1001 is configured to, if the state of the NFCC that is acquired by the second acquiring module 1003 is a non-idle state, send, to the NFCC, the first configuration information of the radio frequency communication to be initiated.

The first configuration information at least includes a radio frequency technology mode identifier used to identify a radio frequency technology and working mode adopted by the NFCC, a radio frequency protocol identifier used to identify a protocol used for radio frequency communication between the NFCC and the remote NFC endpoint, and a radio frequency interface identifier used to identify the radio frequency interface corresponding to the first configuration information.

Figure 11:
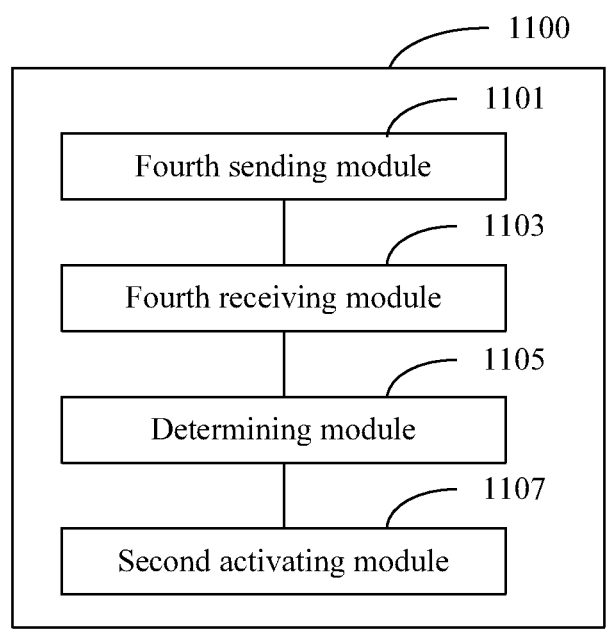
FIG. 11 is a schematic structural diagram of another NFCC according to an embodiment of the present invention.

FIG. 11 is a schematic structural diagram of another NFCC 1100 according to an embodiment of the present invention, and as shown in FIG. 11, the NFCC 1100 includes a fourth sending module 1101, a fourth receiving module 1103, a determining module 1105, and a second activating module 1107.

The NFCC 1100 communicates with the outside using the fourth sending module 1101 and the fourth receiving module 1103.

The fourth receiving module 1103 is configured to receive first configuration information of radio frequency communication to be initiated by a first NFC host, where the first configuration information is sent by the first NFC host.

The determining module 1105 is configured to, if the NFCC is in a non-idle state, determine whether second configuration information matches the first configuration information, where the second configuration information is configuration information of radio frequency communication that a second NFC host performs with a remote NFC endpoint using the NFCC.

The second activating module 1107 is configured to, if the determining module 1105 determines that the second configuration information matches the first configuration information, activate a radio frequency interface corresponding to the first configuration information, so that the first NFC host performs the radio frequency communication with the remote NFC endpoint through the radio frequency interface.

The first configuration information at least includes a radio frequency technology mode identifier used to identify a radio frequency technology and working mode adopted by the NFCC, a radio frequency protocol identifier used to identify a protocol used for radio frequency communication between the NFCC and the remote NFC endpoint, and a radio frequency interface identifier used to identify the radio frequency interface corresponding to the first configuration information.

That the second configuration information matches the first configuration information includes that a radio frequency protocol identifier in the second configuration information is the same as the radio frequency protocol identifier in the first configuration information.

Further, the determining module 1105 is configured to, if the NFCC is in a non-idle and non-active state, determine whether a radio frequency technology mode identifier in the second configuration information is the same as the radio frequency technology mode identifier in the first configuration information; and if the radio frequency technology mode identifier in the second configuration information is the same as the radio frequency technology mode identifier in the first configuration information, after a state of the NFCC becomes an active state, determine whether the radio frequency protocol identifier in the second configuration information is the same as the radio frequency protocol identifier in the first configuration information; or the determining module 1105 is configured to, if the NFCC is in an active state, determine whether the radio frequency protocol identifier in the second configuration information is the same as the radio frequency protocol identifier in the first configuration information.

Further, the fourth receiving module 1103 is further configured to, after the second activating module 1107 activates the radio frequency interface, receive a deactivate request command that is sent by the first NFC host or the second NFC host and used to deactivate the radio frequency interface.

The fourth sending module 1101 is further configured to, if the NFCC further performs, under control of another NFC host, radio frequency communication with the remote NFC endpoint using a radio frequency protocol corresponding to the radio frequency interface, send a deactivate response message that includes a cause identifier to the first NFC host or the second NFC host, where the cause identifier is used to indicate that the NFCC does not end the radio frequency communication with the remote NFC endpoint.

The NFC host 1000 shown in FIG. 10 and the NFCC 1100 shown in FIG. 11 are configured to implement the method in the embodiment shown in FIG. 3 or FIG. 4. For a specific working process and working principle, reference may be made to description of the embodiment shown in FIG. 3 or FIG. 4.

The embodiments shown in FIG. 10 and FIG. 11 provide a radio frequency communication mechanism for an NFC device under a multi-host architecture. In the NFC device under a multi-host architecture, before initiating radio frequency communication with a remote NFC endpoint, a first NFC host can send, to an NFCC, first configuration information of radio frequency communication to be initiated; the NFCC acquires second configuration information of radio frequency communication that is being performed, and determines whether the first configuration information matches the second configuration information; after determining that the first configuration information matches the second configuration information, the NFCC activates a radio frequency interface corresponding to the first configuration information, so that the first NFC host can perform the radio frequency communication with the remote NFC endpoint using the NFCC. In the radio frequency communication mechanism, the first NFC host and a second NFC host can simultaneously control radio frequency communication between the NFCC and the remote NFC endpoint, which avoids a conflict problem; and the first NFC host can also omit a process, such as radio frequency discovery and radio frequency configuration, when performing radio frequency communication with the remote NFC endpoint using the NFCC, thereby accelerating a radio frequency interface activating process. In the embodiment of the present invention, under the multi-host architecture, multiple NFC hosts are allowed to share one radio frequency link, thereby improving use efficiency of the radio frequency link.

Figure 12:
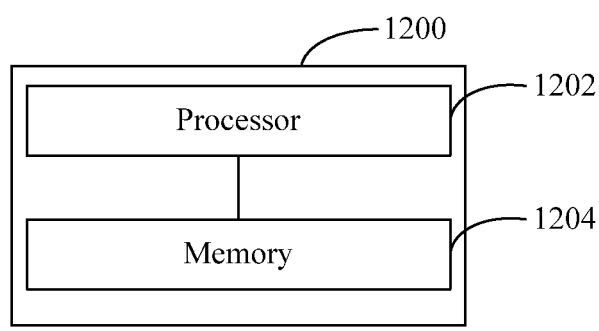
FIG. 12 is a schematic structural diagram of another NFC host according to an embodiment of the present invention.

FIG. 12 is a schematic structural diagram of another NFC host 1200 according to an embodiment of the present invention. As shown in FIG. 12, the NFC host 1200 is a first NFC host, and the NFC host 1200 includes one or more processors 1202; a memory 1204; and one or more programs, where the one or more programs are stored in the memory 1204 and are configured to be executed by the one or more processors 1202, and the one or more programs include an instruction to acquire second configuration information of established radio frequency communication, where the established radio frequency communication is radio frequency communication that a second NFC host performs with a remote NFC endpoint using an NFCC; and an instruction to, if the second configuration information matches first configuration information of radio frequency communication to be initiated by the first NFC host, send, to the NFCC, an activate request command used to activate a radio frequency interface corresponding to the first configuration information, so that the NFCC activates the radio frequency interface and the first NFC host performs the radio frequency communication with the remote NFC endpoint through the radio frequency interface.

Further, the first configuration information at least includes a radio frequency protocol identifier and a radio frequency interface identifier; and the second configuration information at least includes a radio frequency protocol identifier. The radio frequency protocol identifier is used to identify a protocol used for radio frequency communication between the NFCC and the remote NFC endpoint; and the radio frequency interface identifier is used to identify the radio frequency interface corresponding to the first configuration information. That the second configuration information matches first configuration information of radio frequency communication to be initiated by the first NFC host includes that the radio frequency protocol identifier in the second configuration information is the same as the radio frequency protocol identifier in the first configuration information.

Further, the instruction to acquire second configuration information of established radio frequency communication includes an instruction to acquire state information that is used to indicate a state of the NFCC; an instruction to, if the state of the NFCC is an active state, send, to the NFCC, a first get information request command used to acquire the second configuration information; and an instruction to receive the second configuration information sent by the NFCC; or an instruction to send, to the NFCC, a second get information request command used to acquire state information and the second configuration information; and an instruction to receive state information and the second configuration information that are sent by the NFCC in an active state, where the state information is used to indicate a state of the NFCC; or an instruction to send, to the NFCC, a third get information request command used to acquire the second configuration information; and an instruction to receive the second configuration information sent by the NFCC in an active state.

Figure 13:
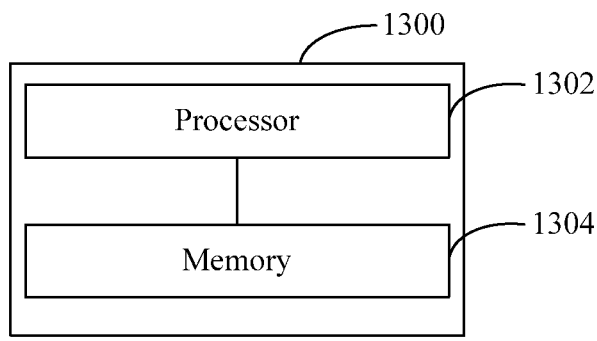
FIG. 13 is a schematic structural diagram of another NFCC according to an embodiment of the present invention.

FIG. 13 is a schematic structural diagram of another NFCC 1300 according to an embodiment of the present invention, and as shown in FIG. 13, the NFCC 1300 includes one or more processors 1302; a memory 1304; and one or more programs, where the one or more programs are stored in the memory 1304 and are configured to be executed by the one or more processors 1302, and the one or more programs include an instruction to send, by an NFCC in an active state, second configuration information of established radio frequency communication to a first NFC host, so that the first NFC host determines whether the second configuration information matches first configuration information of radio frequency communication to be initiated by the first NFC host, where the established radio frequency communication is radio frequency communication that a second NFC host performs with a remote NFC endpoint using the NFCC; an instruction to receive an activate request command that is sent by the first NFC host and used to activate a radio frequency interface corresponding to the first configuration information, where the activate request command is sent by the first NFC host after the first NFC host determines that the second configuration information matches the first configuration information; and an instruction to activate the radio frequency interface according to the activate request command.

Further, the first configuration information at least includes a radio frequency protocol identifier and a radio frequency interface identifier; and the second configuration information at least includes a radio frequency protocol identifier. The radio frequency protocol identifier is used to identify a protocol used for radio frequency communication between the NFCC and the remote NFC endpoint; and the radio frequency interface identifier is used to identify the radio frequency interface corresponding to the first configuration information. That the second configuration information matches the first configuration information includes that the radio frequency protocol identifier in the second configuration information is the same as the radio frequency protocol identifier in the first configuration information.

Further, the one or more programs may further include an instruction to, before the NFCC in an active state sends the second configuration information of the established radio frequency communication to the first NFC host, receive, by the NFCC in an active state, a first get information request command that is sent by the first NFC host and used to acquire the second configuration information; or an instruction to receive a second get information request command that is sent by the first NFC host and used to acquire state information and the second configuration information, where the state information is used to indicate a state of the NFCC; or an instruction to receive a third get information request command that is sent by the first NFC host and used to acquire the second configuration information.

Further, the one or more programs may further include an instruction to, after the radio frequency interface is activated according to the activate request command, receive a deactivate request command that is sent by the first NFC host or the second NFC host and used to deactivate the radio frequency interface; and an instruction to, if the NFCC further performs, under control of another NFC host, radio frequency communication with the remote NFC endpoint using a radio frequency protocol corresponding to the radio frequency interface, send a deactivate response message that includes a cause identifier to the first NFC host or the second NFC host without ending the radio frequency communication with the remote NFC endpoint, where the cause identifier is used to indicate that the NFCC does not end the radio frequency communication with the remote NFC endpoint.

The NFC host 1200 shown in FIG. 12 and the NFCC 1300 shown in FIG. 13 are configured to implement the method in the embodiment shown in FIG. 1 or FIG. 2. For a specific working process and working principle, reference may be made to description of the embodiment shown in FIG. 1 or FIG. 2.

The embodiments shown in FIG. 12 and FIG. 13 provide a radio frequency communication mechanism for an NFC device under a multi-host architecture. In the NFC device under a multi-host architecture, before initiating radio frequency communication with a remote NFC endpoint, a first NFC host can acquire second configuration information of radio frequency communication that a second NFC host has established with the remote NFC endpoint using an NFCC; and then, after determining that the second configuration information matches first configuration information of radio frequency communication to be initiated, the first NFC host requests the NFCC to activate a radio frequency interface corresponding to the first configuration information, so that the first NFC host can perform the radio frequency communication with the remote NFC endpoint using the NFCC. In the radio frequency communication mechanism, the first NFC host and the second NFC host can simultaneously control radio frequency communication between the NFCC and the remote NFC endpoint, which avoids a conflict problem; and the first NFC host can also omit a process, such as radio frequency discovery and radio frequency configuration, when performing radio frequency communication with the remote NFC endpoint using the NFCC, thereby accelerating a radio frequency interface activating process. In the embodiment of the present invention, under the multi-host architecture, multiple NFC hosts are allowed to share one radio frequency link, thereby improving use efficiency of the radio frequency link.

Figure 14:
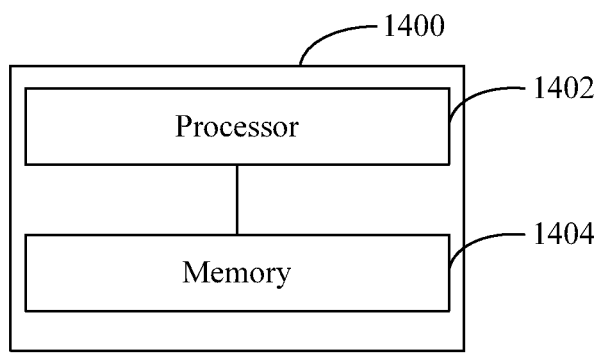
FIG. 14 is a schematic structural diagram of another NFC host according to an embodiment of the present invention.

FIG. 14 is a schematic structural diagram of another NFC host 1400 according to an embodiment of the present invention. As shown in FIG. 14, the NFC host 1400 is a first NFC host, and the NFC host 1400 includes one or more processors 1402; a memory 1404; and one or more programs, where the one or more programs are stored in the memory 1404 and are configured to be executed by the one or more processors 1402, and the one or more programs include an instruction to send, to an NFCC, first configuration information of radio frequency communication to be initiated, so that the NFCC in an active state determines whether the first configuration information matches second configuration information, and after determining that the first configuration information matches the second configuration information, activates a radio frequency interface corresponding to the first configuration information, so that the first NFC host performs the radio frequency communication with a remote NFC endpoint through the radio frequency interface, where the second configuration information is configuration information of radio frequency communication that a second NFC host performs with the remote NFC endpoint using the NFCC.

Further, an instruction to send, to an NFCC, first configuration information of radio frequency communication to be initiated includes an instruction to send, directly to the NFCC, the first configuration information of the radio frequency communication to be initiated; or an instruction to acquire state information used to indicate a state of the NFCC; and if the state of the NFCC is a non-idle state, send, by the first NFC host, to the NFCC, the first configuration information of the radio frequency communication to be initiated.

The first configuration information at least includes a radio frequency technology mode identifier used to identify a radio frequency technology and working mode adopted by the NFCC, a radio frequency protocol identifier used to identify a protocol used for radio frequency communication between the NFCC and the remote NFC endpoint, and a radio frequency interface identifier used to identify the radio frequency interface corresponding to the first configuration information.

Figure 15:
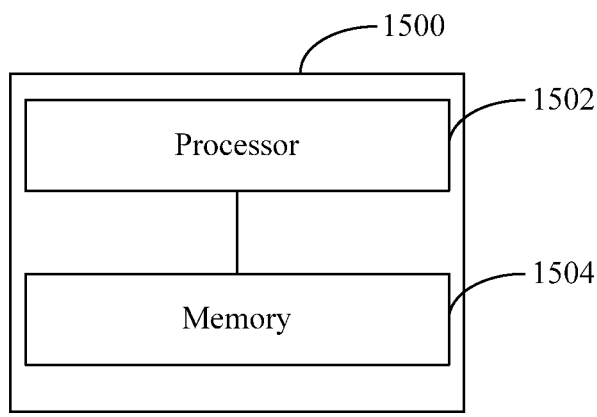
FIG. 15 is a schematic structural diagram of another NFCC according to an embodiment of the present invention.

FIG. 15 is a schematic structural diagram of another NFCC 1500 according to an embodiment of the present invention. As shown in FIG. 15, a NFC host is a first NFC host, and the NFCC 1500 includes one or more processors 1502; a memory 1504; and one or more programs, where the one or more programs are stored in the memory 1504 and are configured to be executed by the one or more processors 1502, and the one or more programs include an instruction to receive first configuration information of radio frequency communication to be initiated by the first NFC host, where the first configuration information is sent by the first NFC host; an instruction to, if the NFCC is in a non-idle state, determine whether second configuration information matches the first configuration information, where the second configuration information is configuration information of radio frequency communication that a second NFC host performs with a remote NFC endpoint using the NFCC; and an instruction to, if the second configuration information matches the first configuration information, activate a radio frequency interface corresponding to the first configuration information, so that the first NFC host performs the radio frequency communication with the remote NFC endpoint through the radio frequency interface.

Further, the first configuration information at least includes a radio frequency technology mode identifier used to identify a radio frequency technology and working mode adopted by the NFCC, a radio frequency protocol identifier used to identify a protocol used for radio frequency communication between the NFCC and the remote NFC endpoint, and a radio frequency interface identifier used to identify the radio frequency interface corresponding to the first configuration information. That the second configuration information matches the first configuration information includes that a radio frequency protocol identifier in the second configuration information is the same as the radio frequency protocol identifier in the first configuration information.

Further, the instruction to determine whether the second configuration information matches the first configuration information includes an instruction to determine, by the NFCC in a non-idle and non-active state, whether a radio frequency technology mode identifier in the second configuration information is the same as the radio frequency technology mode identifier in the first configuration information; and an instruction to determine, if the radio frequency technology mode identifier in the second configuration information is the same as the radio frequency technology mode identifier in the first configuration information, after a state of the NFCC becomes an active state, whether the radio frequency protocol identifier in the second configuration information is the same as the radio frequency protocol identifier in the first configuration information; or an instruction to determine, by the NFCC in an active state, whether the radio frequency protocol identifier in the second configuration information is the same as the radio frequency protocol identifier in the first configuration information.

Further, the one or more programs may further include an instruction to, after activating a radio frequency interface of the NFCC, receive, by the NFCC, a deactivate request command that is sent by the first NFC host or the second NFC host and used to deactivate the radio frequency interface; and an instruction to, if the NFCC further performs, under control of another NFC host, radio frequency communication with the remote NFC endpoint using a radio frequency protocol corresponding to the radio frequency interface, send a deactivate response message that includes a cause identifier to the first NFC host or the second NFC host without ending the radio frequency communication with the remote NFC endpoint, where the cause identifier is used to indicate that the NFCC does not end the radio frequency communication with the remote NFC endpoint.

The NFC host 1400 shown in FIG. 14 and the NFCC 1500 shown in FIG. 15 are configured to implement the method in the embodiment shown in FIG. 3 or FIG. 4. For a specific working process and working principle, reference may be made to description of the embodiment shown in FIG. 3 or FIG. 4.

The embodiments shown in FIG. 14 and FIG. 15 provide a radio frequency communication mechanism for an NFC device under a multi-host architecture. In the NFC device under a multi-host architecture, before initiating radio frequency communication with a remote NFC endpoint, a first NFC host can send, to an NFCC, first configuration information of radio frequency communication to be initiated; the NFCC acquires second configuration information of radio frequency communication that is being performed, and determines whether the first configuration information matches the second configuration information; after determining that the first configuration information matches the second configuration information, the NFCC activates a radio frequency interface corresponding to the first configuration information, so that the first NFC host can perform the radio frequency communication with the remote NFC endpoint using the NFCC. In the radio frequency communication mechanism, the first NFC host and a second NFC host can simultaneously control radio frequency communication between the NFCC and the remote NFC endpoint, which avoids a conflict problem; and the first NFC host can also omit a process, such as radio frequency discovery and radio frequency configuration, when performing radio frequency communication with the remote NFC endpoint using the NFCC, thereby accelerating a radio frequency interface activating process. In the embodiment of the present invention, under the multi-host architecture, multiple NFC hosts are allowed to share one radio frequency link, thereby improving use efficiency of the radio frequency link.

By means of description of the foregoing implementation manners, a person skilled in the art can clearly know that the present invention may be implemented by hardware, or be implemented by firmware, or be implemented by a combination of hardware and firmware. When the present invention is implemented by software, the foregoing functions may be stored in a computer readable medium, or be transmitted as one or more instructions or code in the computer readable medium. The computer readable medium includes a computer storage medium and a communication medium, where the communication medium includes any medium that facilitates transmission of a computer program from one place to another. The storage medium may be any available medium that a computer can access. The following is an example but not a limitation. The computer readable medium may include a random access memory (RAM), a read-only memory (ROM), an Electrically Erasable Programmable ROM (EEPROM), a compact disc ROM (CD-ROM) or other optical disc storage devices, a magnetic disk storage medium or other magnetic storage devices, or any other medium that can be used to carry or store expected program code in an instruction or data structure form and can be accessed by a computer. In addition, any connection may appropriately become a computer readable medium. For example, if software is transmitted from a website, a server, or another remote source using a coaxial cable, an optical cable, a twisted-pair cable, a digital subscriber line (DSL), or a radio technology, such as infrared, radio, or microwave, the coaxial cable, the optical cable, the twisted-pair cable, the DSL, or the radio technology, such as infrared, radio, or microwave is included in a fixation of a homing medium. For example, a disk and a disc used in the present invention include a compact disc (CD), a laser disc, an optical disc, a digital versatile disc (DVD), a floppy disk, and a blue-ray disc (BD) (registered trademark). Generally, a disk magnetically duplicates data, while a disc optically duplicates data using laser. A combination of the foregoing should also fall within the protection scope of a computer readable medium.

To sum up, the foregoing descriptions are merely exemplary embodiments of the present invention, but are not intended to limit the present invention. Any modification, equivalent replacement, or improvement made within the spirit and principle of the present invention shall fall within the protection scope of the present invention.

What is claimed is:

1. A method for near field communication (NFC) radio frequency communication comprising:
    acquiring, by a first NFC host, second configuration information of established radio frequency communication, wherein the established radio frequency communication is radio frequency communication that a second NFC host performs with a remote NFC endpoint using a near field communication controller (NFCC), wherein the second configuration information comprises a second radio frequency protocol identifier, and wherein the second radio frequency protocol identifier is used to identify a protocol used for the radio frequency communication between the NFCC and the remote NFC endpoint; and
    sending, by the first NFC host to the NFCC, an activate request command used to activate a radio frequency interface corresponding to first configuration information when the second configuration information matches the first configuration information of radio frequency communication to be initiated by the first NFC host,
    wherein the first configuration information comprises a first radio frequency protocol identifier and a radio frequency interface identifier,
    wherein the first radio frequency interface identifier is used to identify the radio frequency interface corresponding to the first configuration information,
    wherein the second configuration information matches the first configuration information when the second radio frequency protocol identifier is the same as the first radio frequency protocol identifier,
    wherein the NFCC activates the radio frequency interface using the second configuration information, and
    wherein the first NFC host performs the radio frequency communication with the remote NFC endpoint through the radio frequency interface.

2. The method according to claim 1, wherein acquiring, by the first NFC host, the second configuration information of established radio frequency communication comprises:
    acquiring, by the first NFC host, state information used to indicate a state of the NFCC;
    sending, by the first NFC host to the NFCC, a first get information request command used to acquire the second configuration information when the state of the NFCC is an active state; and
    receiving, by the first NFC host, the second configuration information sent by the NFCC.

3. The method according to claim 1, wherein acquiring, by the first NFC host, the second configuration information of established radio frequency communication comprises:
    sending, by the first NFC host to the NFCC, a second get information request command used to acquire state information and the second configuration information; and
    receiving, by the first NFC host, state information and the second configuration information that are sent by the NFCC in an active state, and
    wherein the state information is used to indicate a state of the NFCC.

4. The method according to claim 1, wherein acquiring, by the first NFC host, the second configuration information of established radio frequency communication comprises:
    sending, by the first NFC host to the NFCC, a third get information request command used to acquire the second configuration information; and
    receiving, by the first NFC host, the second configuration information sent by the NFCC in an active state.

5. A method for near field communication (NFC) radio frequency communication comprising:
    sending, by a near field communication controller (NFCC) in an active state, second configuration information of established radio frequency communication to a first NFC host when the second configuration information matches first configuration information of radio frequency communication to be initiated by the first NFC host, wherein the first configuration information comprises a first radio frequency protocol identifier and a radio frequency interface identifier, wherein the second configuration information comprises a second radio frequency protocol identifier, wherein the second radio frequency protocol identifier is used to identify a protocol used for the established radio frequency communication between the NFCC and a remote NFC endpoint, wherein the radio frequency interface identifier is used to identify a radio frequency interface corresponding to the first configuration information, wherein the second configuration information matches the first configuration information when the second radio frequency protocol identifier in the second configuration information is the same as the first radio frequency protocol identifier in the first configuration information, and wherein the established radio frequency communication is a radio frequency communication that a second NFC host performs with the remote NFC endpoint using the NFCC;
    receiving, by the NFCC, an activate request command that is sent by the first NFC host and used to activate the radio frequency interface corresponding to the first configuration information, wherein the activate request command is sent by the first NFC host when the second configuration information matches the first configuration information; and
    activating, by the NFCC, the radio frequency interface according to the activate request command using the second configuration information.

6. The method according to claim 5, wherein before sending, by the NFCC in the active state, the second configuration information of established radio frequency communication to the first NFC host, the method further comprises receiving, by the NFCC in an active state, a first get information request command that is sent by the first NFC host and used to acquire the second configuration information.

7. The method according to claim 5, wherein before sending, by the NFCC in the active state, the second configuration information of established radio frequency communication to the first NFC host, the method further comprises receiving, by the NFCC, a second get information request command that is sent by the first NFC host and used to acquire state information and the second configuration information, and wherein the state information is used to indicate a state of the NFCC.

8. The method according to claim 5, wherein before sending, by the NFCC in the active state, the second configuration information of established radio frequency communication to the first NFC host, the method further comprises receiving, by the NFCC, a third get information request command that is sent by the first NFC host and used to acquire the second configuration information.

9. The method according to claim 5, wherein after activating, by the NFCC, the radio frequency interface according to the activate request command, the method further comprises:
receiving, by the NFCC, a deactivate request command that is sent by the first NFC host or the second NFC host and used to deactivate the radio frequency interface; and
sending, by the NFCC, a deactivate response message that comprises a cause identifier to the first NFT host or the second NFC host without ending a radio frequency communication with the remote NFC endpoint when the NFCC further performs, under control of another NFC host, the radio frequency communication with the remote NFC endpoint using a radio frequency protocol corresponding to the radio frequency interface, and
wherein the cause identifier is used to indicate that the NFCC does not end the radio frequency communication with the remote NFC endpoint.

10. A near field communication (NFC) host comprising:
one or more processors;
a transmitter coupled to the one or more processors; and
a memory storing programming for execution by the one or more processors, the programming including instructions for acquiring second configuration information of established radio frequency communication,
wherein the established radio frequency communication is a radio frequency communication established between a second NFC host and a remote NFC endpoint,
wherein the second configuration information comprises a second radio frequency protocol identifier, and
wherein the second radio frequency protocol identifier is used to identify a protocol used for the radio frequency communication between the NFCC and the remote NFC endpoint,
wherein the transmitter is configured to send, to the NFCC, an activate request command used to activate a radio frequency interface corresponding to first configuration information when the second configuration information matches the first configuration information of a radio frequency communication to be initiated by the first NFC host,
wherein the first configuration information comprises a first radio frequency protocol identifier and a radio frequency interface identifier,
wherein the radio frequency interface identifier is used to identify the radio frequency interface corresponding to the first configuration information,
wherein that the second configuration information matches first configuration information of radio frequency communication to be initiated by the first NFC host when the second radio frequency protocol identifier in the second configuration information is the same as the first radio frequency protocol identifier in the first configuration information,
wherein the NFCC activates the radio frequency interface using the second configuration information, and
wherein the first NFC host performs the radio frequency communication with the remote NFC endpoint through the radio frequency interface.

11. The NFC host according to claim 10, further comprising a receiver coupled to the one or more processors, wherein the programming further comprises instructions for acquiring state information used to indicate a state of the NFCC, wherein the transmitter is further configured to transmit, to the NFCC, a first get information request command used to acquire the second configuration information when the state of the NFCC is an active state, and wherein the receiver is configured to receive the second configuration information sent by the NFCC.

12. The NFC host according to claim 10, further comprising a receiver coupled to the one or more processors, wherein the transmitter is further configured to send, to the NFCC, a second get information request command used to acquire state information and the second configuration information, wherein the receiver is further configured to receive state information and the second configuration information that are sent by the NFCC in an active state, and wherein the state information is used to indicate a state of the NFCC.

13. The NFC host according to claim 10, further comprising a receiver coupled to the one or more processors, wherein the transmitter is further configured to send, to the NFCC, a third get information request command used to acquire the second configuration information, and wherein the receiver is further configured to receive the second configuration information sent by the NFCC in an active state.

14. A near field communication controller (NFCC) comprising:
one or more processors;
a transmitter coupled to the one or more processors and configured to send, by the near field communication controller (NFCC) in an active state, second configuration information of established radio frequency communication to a first NFC host when the second configuration information matches first configuration information of a radio frequency communication to be initiated by the first NFC host, wherein the first configuration information comprises a first radio frequency protocol identifier and a radio frequency interface identifier, wherein the second configuration information comprises a second radio frequency protocol identifier, wherein the second radio frequency protocol identifier is used to identify a protocol used for radio frequency communication between the NFCC and the remote NFC endpoint, wherein the radio frequency interface identifier is used to identify a radio frequency interface corresponding to the first configuration information, wherein the second configuration information matches the first configuration information when the second radio frequency protocol identifier in the second configuration information is the same as the first radio frequency protocol identifier in the first configuration information, and wherein the established radio frequency communication is a radio frequency communication established between a second NFC host and a remote NFC endpoint;

a receiver coupled to the one or more processors and configured to receive an activate request command that is sent by the first NFC host and used to activate the radio frequency interface corresponding to the first configuration information, wherein the activate request command is sent by the first NFC host when the second configuration information matches the first configuration information; and a memory storing programming for execution by the one or more processors, the programming including instructions for activating the radio frequency interface according to the activate request command using the second configuration information.

15. The NFCC according to claim 14, wherein the receiver is further configured to receive by the NFCC in an active state, a first get information request command that is sent by the first NFC host and used to acquire the second configuration information before the transmitter sends the second configuration information to the first NFC host.

16. The NFCC according to claim 14, wherein the receiver is further configured to receive a second get information request command that is sent by the first NFC host and used to acquire state information and the second configuration information before the transmitter sends the second configuration information to the first NFC host, and wherein the state information is used to indicate a state of the NFCC.

17. The NFCC according to claim 14, wherein the receiver is further configured to receive a third get information request command that is sent by the first NFC host and used to acquire the second configuration information before the transmitter sends the second configuration information to the first NFC host.

18. The NFCC according to claim 14, wherein, after activating the radio frequency interface according to the activate request command the receiver s further configured to receive a deactivate request command that is sent by the first NFC host or the second NFC host and used to deactivate the radio frequency interface, wherein the transmitter is further configured to send a deactivate response message that comprises a cause identifier to the first NFC host or the second NFC host without ending a radio frequency communication with the remote NFC endpoint when the NFCC further performs, under control of another NFC host, the radio frequency communication with the remote NFC endpoint using a radio frequency protocol corresponding to the radio frequency interface, and wherein the cause identifier is used to indicate that the NFCC does not end the radio frequency communication with the remote NFC endpoint.

* * * * *

UNITED STATES PATENT AND TRADEMARK OFFICE
CERTIFICATE OF CORRECTION

PATENT NO.        : 9,467,209 B2
APPLICATION NO.   : 14/573629
DATED             : October 11, 2016
INVENTOR(S)       : Miao Wang et al.

It is certified that error appears in the above-identified patent and that said Letters Patent is hereby corrected as shown below:

In the Claims

Column 39, Line 30, Claim 9 should read:

The method according to claim 5 wherein after activating, by the NFCC, the radio frequency interface according to the activate request command, the method further comprises:
receiving, by the NFCC, a deactivate request commend that is sent by the first NFC host or the second NFC host and used to deactivate the radio frequency interface; and
sending, by the NFCC, a deactivate response message that comprises a cause identifier to the first NFC host or the second NFC host without ending a radio frequency communication with the remote NFC endpoint when the NFCC further performs, under control of another NFC host, the radio frequency communication with the remote NFC endpoint using a radio frequency protocol corresponding to the radio frequency interface, and
wherein the cause identifier is used to indicate that the NFCC does not end the radio frequency communication with the remote NFC endpoint.

Signed and Sealed this
Twenty-seventh Day of December, 2016

Michelle K. Lee
*Director of the United States Patent and Trademark Office*